(12) United States Patent
Koike et al.

(10) Patent No.: US 6,172,809 B1
(45) Date of Patent: Jan. 9, 2001

(54) SURFACE LIGHT SOURCE DEVICE WITH POLARIZATION FUNCTION

(75) Inventors: Yasuhiro Koike, Yokohama; Takayuki Arai, Kasukabe, both of (JP)

(73) Assignee: Enplas Corporation, Kawaguchi (JP)

( * ) Notice: Under 35 U.S.C. 154(b), the term of this patent shall be extended for 0 days.

(21) Appl. No.: 09/127,822

(22) Filed: Aug. 3, 1998

Related U.S. Application Data

(63) Continuation of application No. 08/403,323, filed on Mar. 13, 1995, now Pat. No. 5,982,540.

(30) Foreign Application Priority Data

Mar. 16, 1994 (JP) ......................................... 6-72746
Mar. 31, 1994 (JP) ......................................... 6-83717

(51) Int. Cl.$^7$ ................................................. G02B 5/30
(52) U.S. Cl. .......................... 359/487; 359/483; 362/31; 349/65
(58) Field of Search .................... 362/31, 19; 349/65, 349/64, 66; 353/20; 359/483, 485, 487

(56) References Cited

U.S. PATENT DOCUMENTS

| | | | |
|---|---|---|---|
| 4,059,916 | 11/1977 | Tachihara et al. | 362/31 |
| 4,453,200 | 6/1984 | Treka et al. | 362/31 |
| 4,618,216 | 10/1986 | Suzawa | 349/65 |
| 4,706,173 | 11/1987 | Hamada et al. | 362/341 |
| 4,794,492 | 12/1988 | Vinther | 362/31 |
| 4,909,604 | * 3/1990 | Kobayashi et al. | 362/31 |
| 5,046,826 | * 9/1991 | Iwamoto et al. | 359/49 |
| 5,050,946 | 9/1991 | Hathaway et al. | 385/33 |
| 5,123,077 | 6/1992 | Endo et al. | 385/129 |
| 5,157,526 | 10/1992 | Kondo et al. | 549/96 |
| 5,202,950 | 4/1993 | Arego et al. | 385/146 |
| 5,211,463 | 5/1993 | Kalmanash | 362/26 |
| 5,295,048 | 3/1994 | Park et al. | 362/26 |
| 5,303,322 | 4/1994 | Winston et al. | 385/146 |
| 5,359,691 | 10/1994 | Tai et al. | 385/146 |
| 5,422,756 | * 6/1995 | Weber | 359/487 |
| 5,467,208 | * 11/1995 | Kokawa et al. | 362/31 |
| 5,542,017 | * 7/1996 | Koike | 362/31 |
| 5,548,670 | 8/1996 | Koike | 385/27 |
| 5,580,932 | * 12/1996 | Koike | 385/130 |
| 5,684,630 | * 11/1997 | Arai | 359/487 |

FOREIGN PATENT DOCUMENTS

| | | |
|---|---|---|
| 51-89888 | 7/1976 | (JP) . |
| 2-221926 | 9/1990 | (JP) . |
| 4-145485 | 5/1992 | (JP) . |
| 7253511 | 10/1995 | (JP) . |
| WO 93/06509 | 4/1993 | (WO) . |
| WO 95/03559 | 2/1995 | (WO) . |

* cited by examiner

Primary Examiner—Thong Nguyen
Assistant Examiner—Euncha Cherry
(74) Attorney, Agent, or Firm—Staas & Halsey, LLP

(57) ABSTRACT

Light is supplied into a light incident surface 2 from a fluorescent lamp L enclosed by a silver foil sheet R, and parallelized illuminating light flux is taken out from a light exit surface 3. On a back surface 4 side of a light flux parallelizer 1, across or without a thin air layer 5, a polarization converter Σ is disposed. The polarization converter Σ reinforces the polarization function of the surface light source device through polarization conversion action accompanying reflection in the prism. At a position confronting the light exit surface 3 across an air layer 7, a polarization separating plate 8 is disposed. At a further outside, across an air layer 9, an exit light direction modifier 10 is disposed. A bright polarized illuminating light flux is emitted from a light exit surface 11. When applied to a backlight of a liquid crystal display, a liquid crystal display panel is disposed at a further outside of the exit light direction modifier 10.

7 Claims, 26 Drawing Sheets

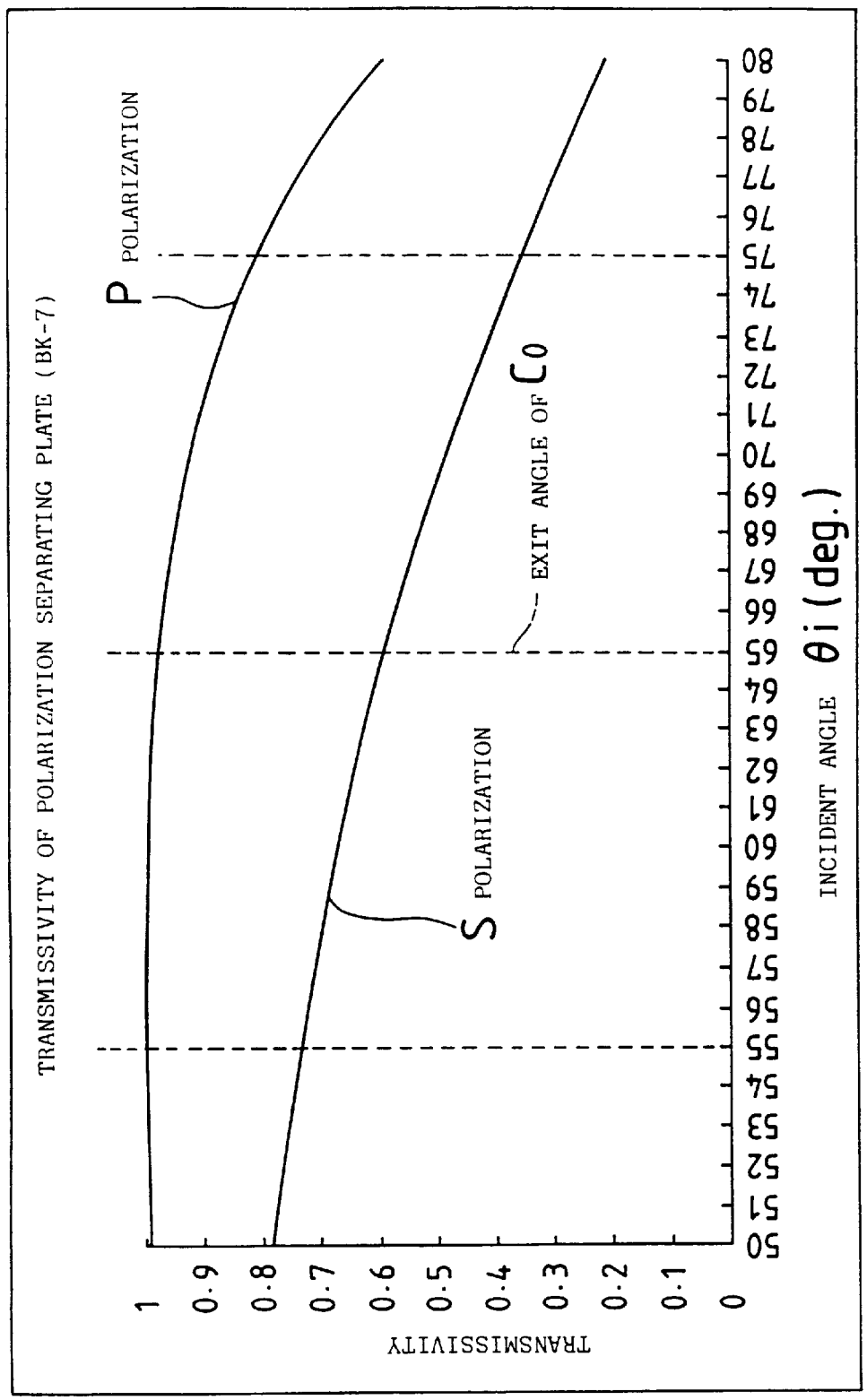
F I G. 6

FIG. 7
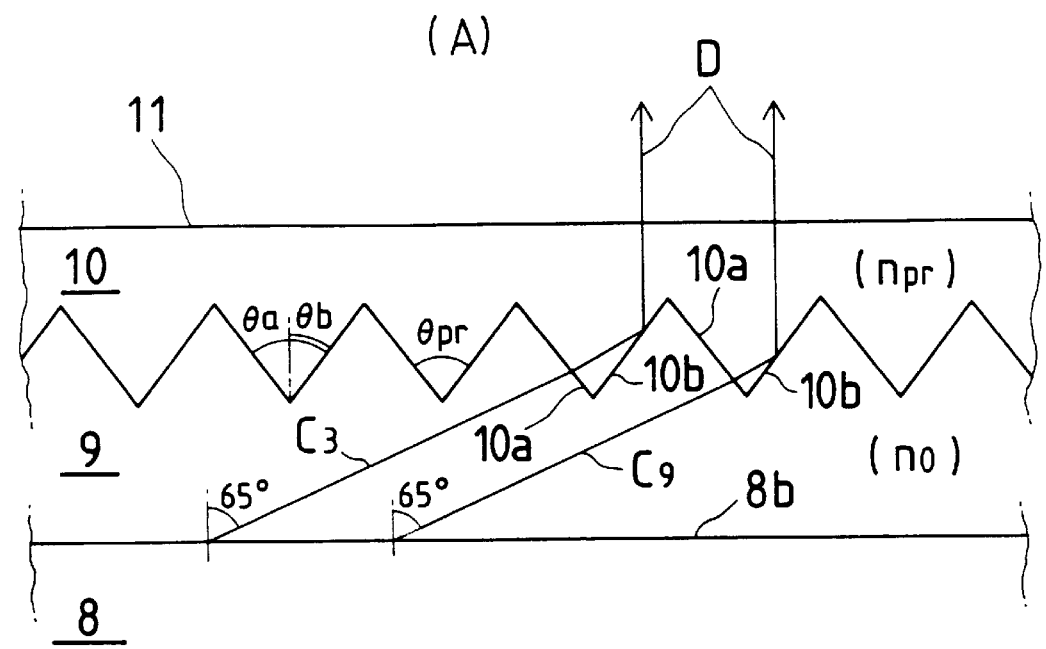
(A)
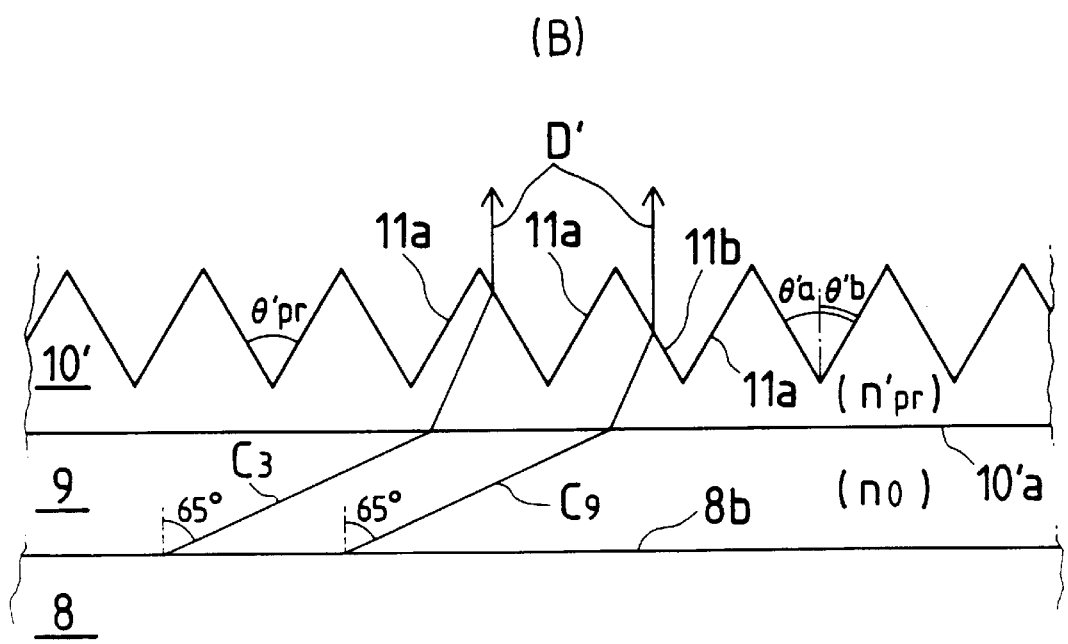
(B)

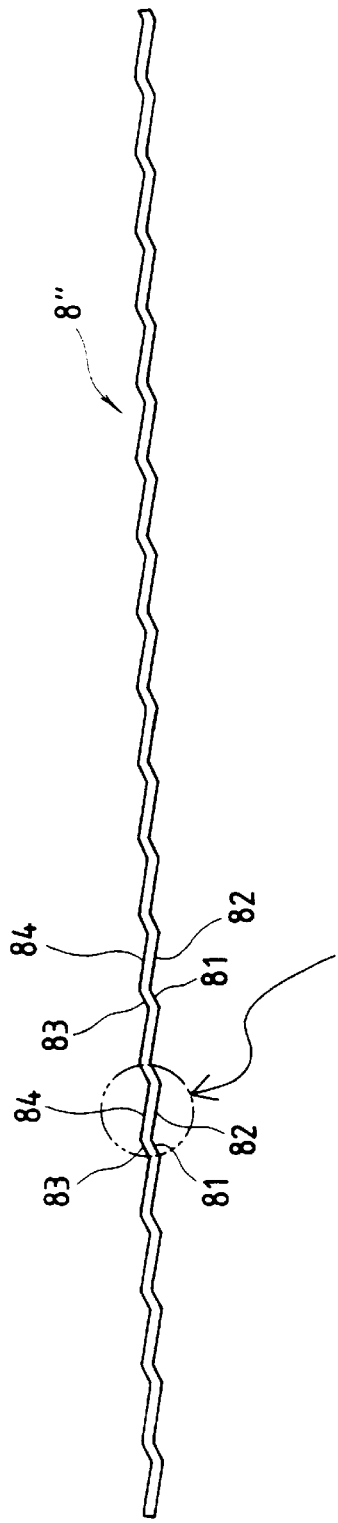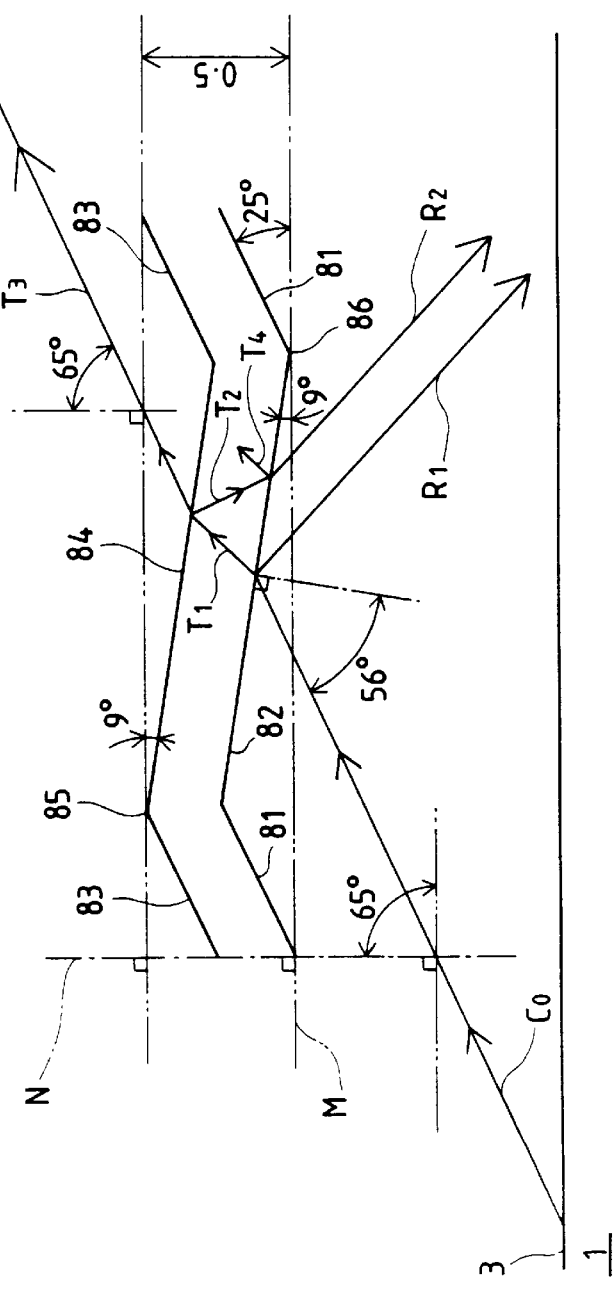
FIG. 10

$n_3 = 2.3 (TiO_2)$ $n_2 = 1.46 (SiO_2)$

182

$n_1 = 2.3 (TiO_2)$

181

$n_0 = 1$ (AIR)

7

$D_0 \begin{cases} Is = 100 \\ Ip = 100 \end{cases}$

70°

$D_2$ 24.1°

$D_1$ 40.1°

$D_3$ 24.1°

$D_5$ $\begin{cases} Is = 39.7 \\ Ip = 95.7 \end{cases}$ $D_6$
Rs = 9.3%
Rp = 1.9%

$D_4$
Rs = 9.3%
Rp = 1.9%

Rs = 51.8%
Rp = 0.55%

18

FIG. 22
(1)
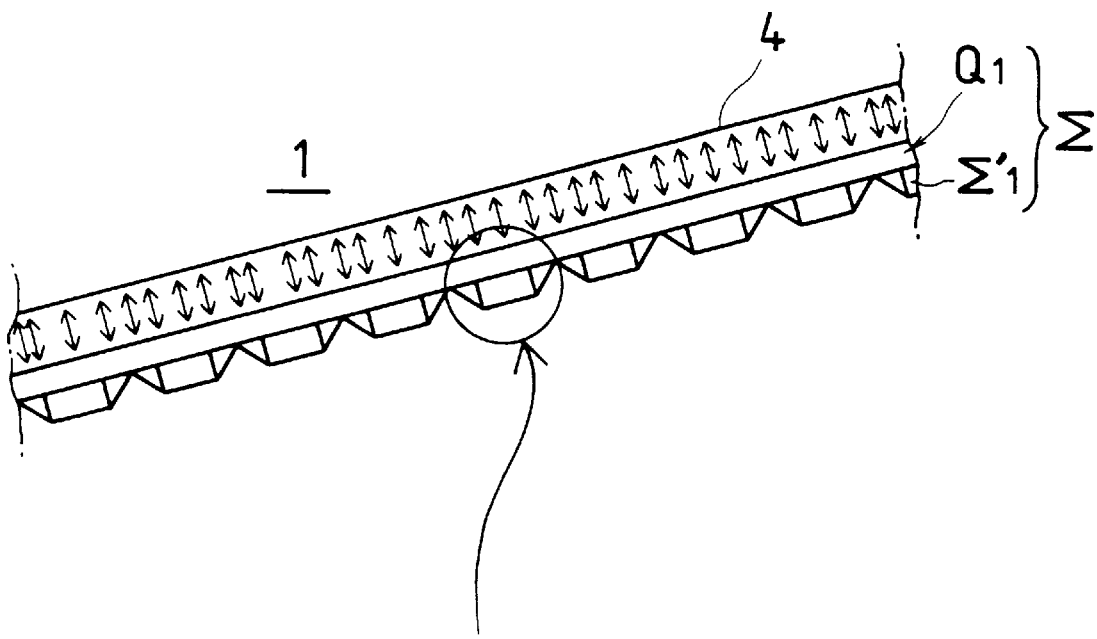
(2)
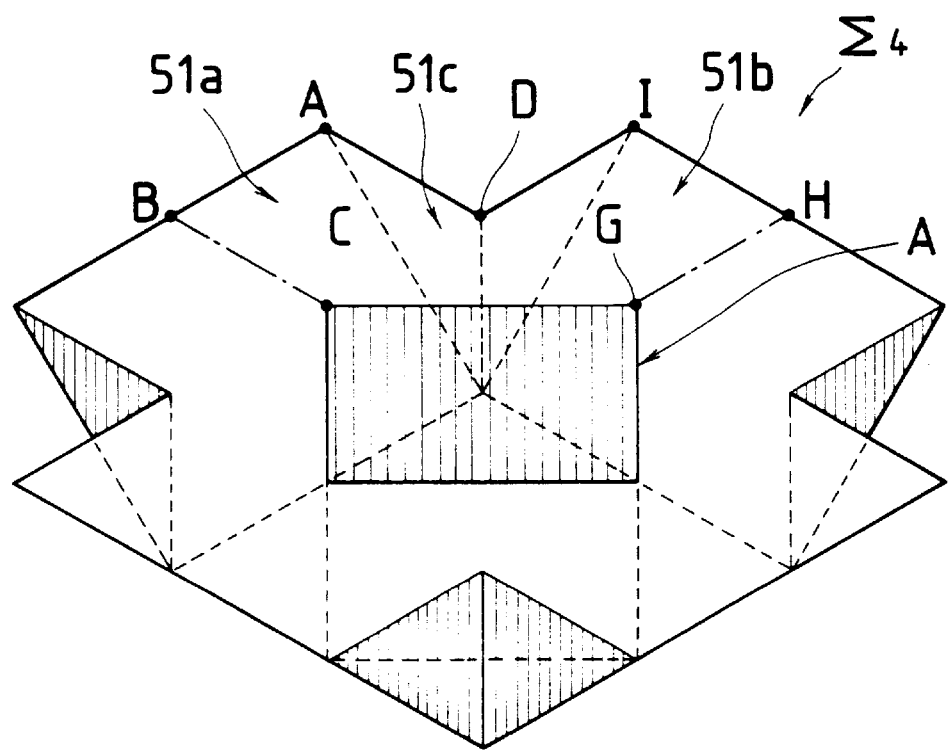

FIG. 24
(1)
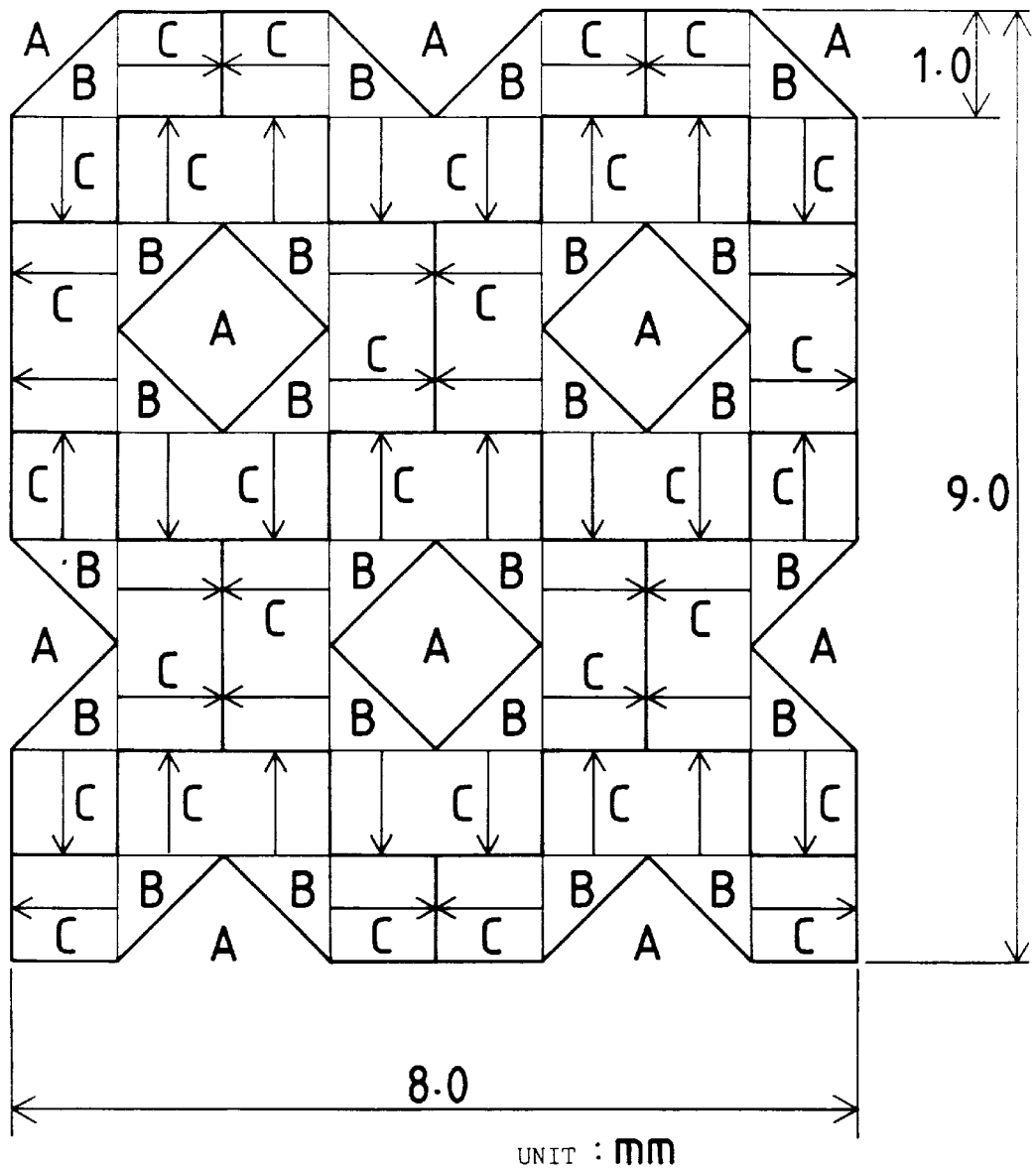
UNIT : mm
(2)
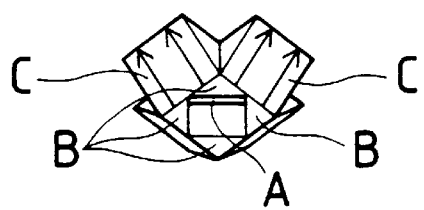

FIG. 26
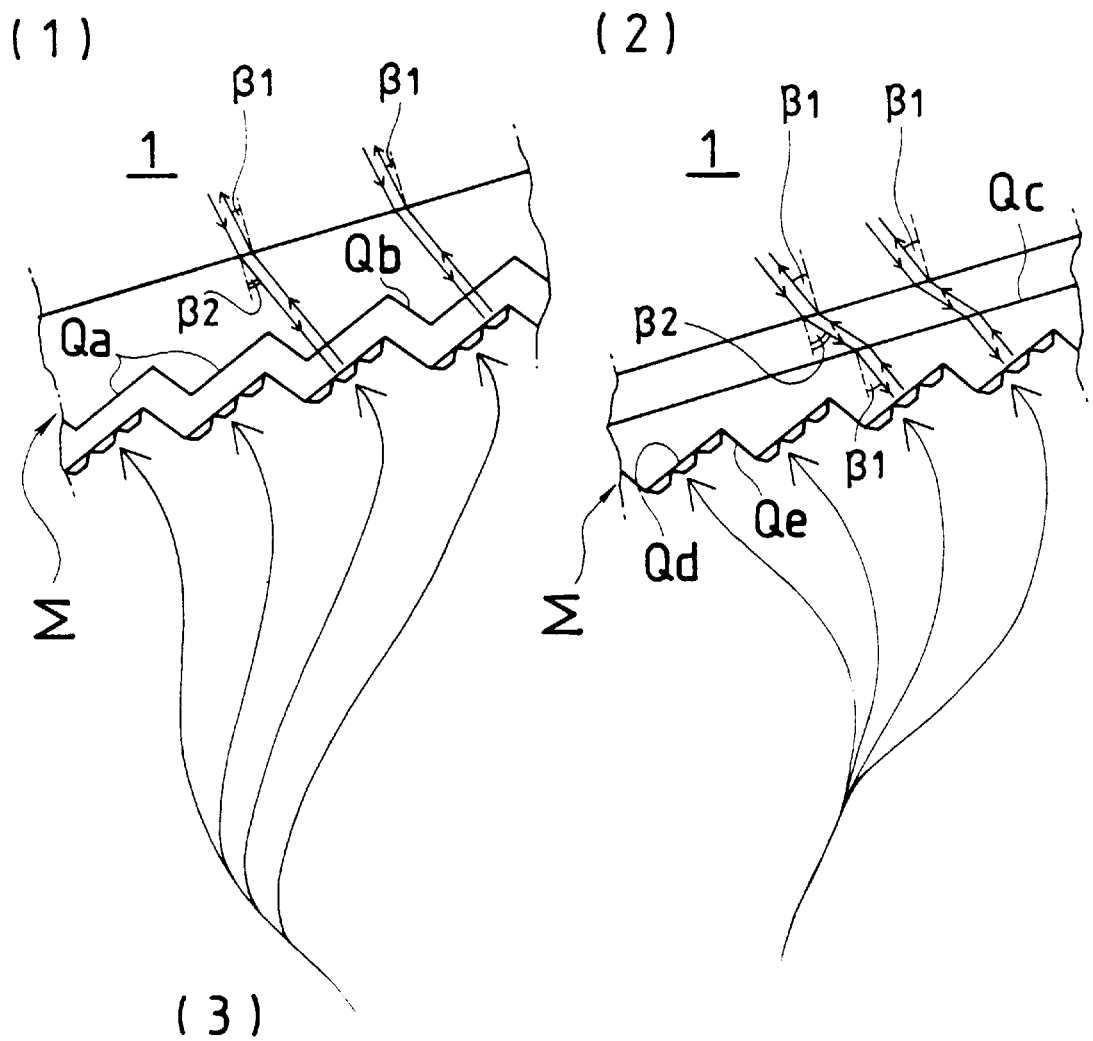
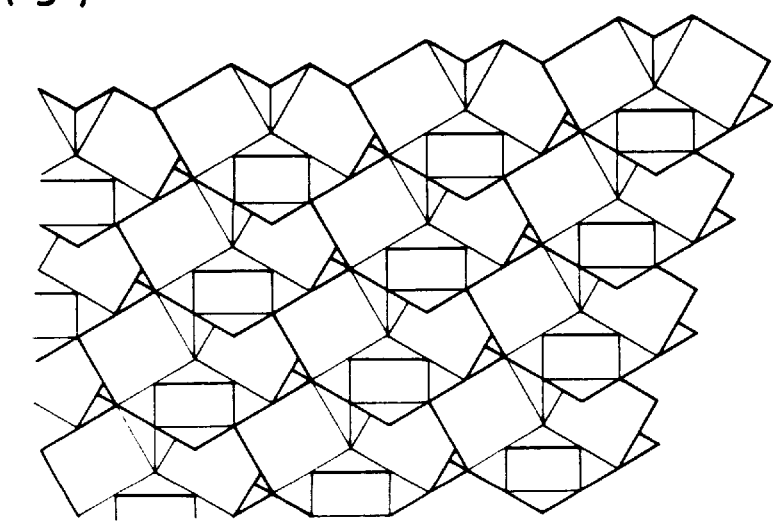

SURFACE LIGHT SOURCE DEVICE WITH POLARIZATION FUNCTION

This application is a continuation of application Ser. No. 08/403,323, filed Mar. 13, 1995, now U.S. Pat. No. 5,982,540.

BACKGROUND ART

1. Technical Field

The present invention relates to a surface light source device having a function for generating a polarized light flux from a polarization-free light or a function for generating a much polarized light flux from a less polarized light (hereinafter called polarization function). The surface light source device of the invention is employed in applications requiring polarized light flux, and is particularly applied beneficially to backlight of a liquid crystal display.

2. Description of the Related Art

It has been hitherto known well to apply a surface light source device comprising a light guide plate having light scattering ability on the surface or inside, and a light source (such as fluorescent lamp) disposed at the side to backlight of a liquid crystal display or the like (for example, Japanese Laid-open Patents No. H2-221926 and No. H4-145485, and Japanese Laid-open Utility Model No. 51-89888).

In these "conventional" surface light source devices, the principle is based on the idea that the quantity of light emitted from the light exit surface is maintained by making the light propagation direction as random as possible by the light scattering action in the light guide or surface region. Therefore, the presented illuminating light is free from evident directivity, and does not have function for generating the light possessing polarization in a specific direction.

By contrast, the present inventor previously proposed a light flux parallelizing apparatus by making use of light flux parallelizing function of a wedge-shaped light scattering light guide having characteristic parameters for defining the scattering characteristic (effective scatter irradiation parameter E and correlation distance a; detail given later) determined in a specific range (Japanese Patent Application No. H5-349479, filed Dec. 28, 1993). When a modified surface light source device is constituted by combining the light flux parallelizing apparatus with a light source, the illuminating light flux has a definite directivity, but polarization polarized in a specific direction cannot be generated.

As the means for obtaining polarized light from a polarization free light emitted from an ordinary light source, polarizing plates and beam splitter type polarizer are known. These polarizing elements eliminate the polarized components in a direction orthogonal to a specific direction in order to obtain a polarized light.

As a result, about half of the light energy is lost. Therefore, if the polarizing element is combined with any one of the surface light source devices mentioned above, it is difficult to obtain polarized illuminating light flux efficiently.

On the other hand, when a polarization-free illuminating light flux is entered from behind a liquid crystal display panel of a liquid crystal display, by the polarizing plate provided at the light incident side of the liquid crystal display panel in order to enter the light polarized in a specific direction into the liquid crystal layer, about half of the light energy of the illuminating light flux generated in the surface light source device is wasted. Accordingly, the brightness of the display of the liquid crystal display is sacrificed.

If the surface light source device having a capability of generating a light flux polarized in a specific direction having a suppressed light energy loss is presented, by employing it in the backlight of the liquid crystal display, the loss of the liquid crystal display panel when passing through the polarizing plate can be lowered (The polarizing direction of the illuminating light flux from the backlight and the polarizing axis direction of the polarizing plate are set parallel.). From such viewpoint, realization of a surface light source device having a capacity of generating a light flux polarized in a specific direction with a suppressed light energy loss has been waited for.

OBJECTS AND SUMMARY OF THE INVENTION

It is an object of the invention to present a surface light source device with polarization function capable of suppressing the lowering of efficiency of use of light energy in polarization, and obtaining a bright polarized light flux.

It is another object of the invention to present a surface light source device with polarization function suited to backlight of a liquid crystal display.

To achieve the objects, the invention presents a surface light source device comprising, as a basic constitution, a light flux parallelizer made of a light scattering light guide plate having a wedge-shaped section, light feed means disposed at the thicker end side of the light flux parallelizer, and light permeable polarization separating means having reflection characteristic dependent on the polarization components, being disposed so as to extend along the light exit surface of the light flux parallelizer. The polarization separating means may include the following.

[1] A polarization separating plate made of a transparent optical material having a refractive index in a range of 1.3 to 2.0

[2] A plurality of polarization separating plate disposed in laminates across air layer, each having a refractive index in a range of 1.3 to 2.0

[3] A polarization separating plate having a refractive index in a range of 1.3 to 2.0, wherein repetitive slopes for approximately satisfying the Brewster's angle condition for the exit direction of the parallel light flux emitted from the light exit surface of the light flux parallelizer are formed on the light incident surface of the polarization separating plate

[4] A polarization separating plate having a multilayer film made of an optical material having a refractive index in a range of 1.3 to 2.3

By directing the light turned back from the light permeable polarization separating means, after modifying the polarized state of the light the light flux parallelizer from the light permeable polarization separating means again, in order to obtain light of higher degree of polarization, a polarization scrambler or polarization converting means may be provided along the surface opposite to the light exit surface of the light flux parallelizer.

The polarization converting means may include the following.

[1] Polarization converting means having a phase difference plate and light reflecting means disposed the outside of the phase difference plate

[2] Polarization converting means containing a region of multiple one-body compound prism regions arranged parallel by sequentially coupling three volume region elements of triangular columnar shape with both ends in right-angled isosceles triangles so that the axial directions of the triangular column corresponding to the elements respectively may be directed in three mutually orthogonal directions

[3] Polarization converting means containing a region of multiple one-body compound prism regions arranged parallel by coupling a plurality of unit volume regions, the unit volume region being a one-body volume region sequentially coupling volume region elements of triangular columnar shape with both ends in right-angled isosceles triangles so that the axial directions of the triangular column corresponding to the elements respectively may be directed in three mutually orthogonal directions

[4] Polarization converting means containing a region of multiple one-body compound prism regions arranged parallel by coupling a plurality of unit volume regions, the unit volume region being a one-body volume region sequentially coupling volume region elements of triangular columnar shape with both ends in right-angled isosceles triangles so that the axial directions of the triangular column corresponding to the elements respectively may be directed in three mutually orthogonal directions, and a substrate region made of an optical material by repeatedly forming slopes on both face and back surfaces, wherein the compound prism region arranging region is provided on the repeated slopes on one of the face and back surfaces, and is optically and mechanically coupled with the substrate region

[5] Polarization converting means containing a region of multiple one-body compound prism regions arranged parallel by coupling a plurality of unit volume regions, the unit volume region being a one-body volume region sequentially coupling volume region elements of triangular columnar shape with both ends in right-angled isosceles triangles so that the axial directions of the triangular column corresponding to the elements respectively may be directed in three mutually orthogonal directions, and a substrate region made of an optical material by repeatedly forming slopes on one of face and back surfaces, with the other surface being a flat plane, wherein the compound prism region arranging region is provided on the repeated slopes, and is optically and mechanically coupled with the substrate region In order to maintain high the parallelism of the light flux emitted from the light flux parallelizer, the scattering ability given to the light scattering light guide for composing the light flux parallelizer is preferred to satisfy the following condition.

Condition: $0.06 \, \mu m \leq a \leq 35 \, \mu m$ where 'a' is the quantity called correlation distance. This correlation distance 'a' is defined as the value of 'a' when, as described later, the correlation function $\gamma(r)$ of refractive index non-uniform structure for providing the light scattering light guide with a light scattering ability is approximated by $\gamma(r) = \exp[-r/a]$ (where r is the distance between two points in the light scattering light guide).

On the outside of the polarization separating means disposed along the light exit surface of light flux parallelizer, the light exit surface direction modifier may be disposed. This light exit direction modifier has a function of modifying the propagation direction of the illuminated light flux.

The invention is based on a novel principle that a light flux containing a rich polarization component in a specific direction can be generated at a relatively high efficiency of using energy by combining the light flux parallelizing function of light flux parallelizer composed of light scattering light guide, and the reflection/transmission characteristic related with the approximate Brewster's angle condition.

In addition to this principle, it is also proposed to introduce the idea of making use of the polarization converting action accompanying the internal reflection of the compound prism coupling the triangular column prisms in mutually orthogonal relation.

To help understand the function of the light flux parallelizer used in the invention, a general descriptive method of scatter characteristic of the light scattering light guide for composing the light flux parallelizer is explained by citing the theory by Debye. Herein, reference is made to the effective scatter irradiation parameter E and correlation distance a, and further the light flux parallelizing function is explained.

When light of intensity I0 passes through a medium by y (cm) and the intensity is attenuated to I due to scatter, the effective scatter irradiation parameter E is defined in formula (1) or (2).

$$E[\text{cm}^{-1}] = -[1n(I/I0)]/y \qquad (1)$$

$$E[\text{cm}^{-1}] = -(1/I) \cdot dI/dy \qquad (2)$$

Formulas (1) and (2) are expressions of so-called integral form and differential form, respectively, and their physical meanings are equivalent. This E is also called turbidity.

On the other hand, the scattering light intensity when light scatter occurs due to non-uniform structure distributed in a medium is expressed in formula (3) in an ordinary case (Vv scatter) when the majority of exit light is longitudinal polarization for an incident light of longitudinal polarization.

$$Vv = [(4\langle\eta^2\rangle\pi^3)/\lambda_0^4] \int_0^\infty C\gamma(r) dr \qquad (3)$$

Here, $$C = [r^2 \sin(\nu s r)]/\nu s r \qquad (4)$$

In the case that the incident light is a nantural light, supposing the scatter light intensity to be Ivh, it is known that Ivh is expressed in the following formula (5). This is the expression obtained by multiplying the right side of formula (3) by $(1+\cos^2 \Phi)/2$, considering the Hh scattering.

$$Ivh = Vv(1+\cos^2 \Phi)/2 \qquad (5)$$

where $\lambda 0$ is the wavelength of incident light, $\nu=(2\pi n)/\lambda 0$, $s=2 \sin(\Phi/2)$ Moreover, n is the refractive index of the medium, $\Phi$ is the scatter angle, and $\langle\eta^2\rangle$ is the dielectric constant fluctuation square mean in the medium (hereinafter, as $\langle\eta^2\rangle >= \tau$, $\tau$ is used instead), and $\gamma(r)$ is the correlation function. The correlation function $\gamma(r)$ is expressed in formula (6).

$$\gamma(r) = \exp(-r/a) \qquad (6)$$

According to Debye, when the refractive index non-uniform structure dispersed in the medium has interface between phase A and phase B, the following formulas (7) and (8) are established in the relation among the correlation function $\gamma(r)$, correlation distance a, and dielectric constant fluctuation square mean $\tau$.

$$a[\text{cm}] = (4V/S) \cdot \phi A \phi B \qquad (7)$$

$$\tau = \phi A \phi B (nA^2 - nB^2)^2 \qquad (8)$$

where V: total volume, S: total area of interface, $\phi A$, $\phi B$: volume percentages of phases A and B, and nA, nB: refractive indices of phases A and B.

Assuming that the non-uniform structure be composed of spherical interface with a radius R, the correlation distance a is expressed in formula (9).

$$a[cm]=(4/3)R(1-\phi A) \quad (9)$$

Using formula (6) about the correlation function γ(r), when the effective scatter irradiation parameter E when the spontaneous light enters the medium is calculated according to (5), the result is as follows.

$$E=[32a^3\tau\pi^4)/\lambda 0^4]\cdot f(b) \quad (10)$$

where $$f(b)=[\{(b+2)^2/b^2(b+1)\}-\{(b+2)/b^3\}\cdot 1n(b+1)] \quad (11)$$

$$b=4v^2 a^2 \quad (12)$$

From the relations mentioned above, by varying the correlation distance a and dielectric constant fluctuation square mean τ, it is possible to control the scatter light intensity, angle dependence of scattering light intensity, and effective scatter irradiation parameter E.

In other words, if both the correlation distance "a" and the dielectric constant fluctuation "Y" are uniform throughout the volume of a light guide, the light guide has a "uniform scattering poer". Any light provided with a "uniform scattering power" yields a constant scattering property throughout the volume of the light guide.

For instance, a light guide made of a material composed of a resin matrix, with fine particles dispersed in the matrix, uniformly throughout the volume of the matrix has a "uniform scattering power." Examples and methods of producing such devices are described in detail later.

FIG. 1 graphically shows the relation of the correlation distance a for giving a specific value of E and the dielectric constant fluctuation square mean τ in the cases of E=50 [cm$^{-1}$] and E=100[cm$^{-1}$]. The axis of abscissas of the graph denotes the correlation distance a, and the axis of ordinates represents the dielectric constant fluctuation square mean τ.

The value of E may be utilized as the index for evaluating the "strength" of the scattering capability of the light scattering light guide medium. Generally speaking, a relatively large E gives a relatively strong scattering capability, and a relatively small E gives a relatively weak scattering capability. E=0 denotes a scatter-free state. Therefore, in a surface light source of a relatively large size, it is preferred to use a light flux parallelizer composed of a light scattering light guide having a relatively small E value. To the contrary, in a surface light source of a relatively small size, it is preferred to use a light flux parallelizer composed of a light scattering light guide having a relatively large E value.

The screen size (vertical and lateral directions) of an ordinary liquid crystal display is in a range of several centimeters to scores of centimeters. On the bright surface of the surface light source device incorporated as the backlight, a nearly equivalent size is demanded. In this case, a preferred range of the effective scatter irradiation parameter E of the light scattering light guide to be used is approximately as follows.

$$0.5[cm^{-1}] \leq E \leq 50 \ [cm^{-1}]$$

On the other hand, the correlation distance a is a quantity closely related with the direction characteristic of individual scatter phenomena in the light scattering light guide. As estimated from formulas (3) to (5), the light scatter in the light scattering light guide generally tends to scatter forward. However, the intensity of forward scatter varies depending on the correlation distance a.

FIG. 2 is a graph showing this in two values of a. The axis of abscissas of the graph denotes the scattering angle Φ (the incident ray propagation direction is supposed to be Φ=0°). The axis of ordinates represents the normalized scattering intensity assuming a natural light, that is, the value of formula (5) normalized with respect to Φ=0°, Vvh(Φ)/Vvh (0).

As shown in the diagram, the graph of the normalized scattering intensity for a=0.13 μm is a moderate decrease function of Φ. On the other hand, in the case of a=1.3 μm, the graph of the normalized scattering intensity is a function decreasing μ rapidly in a small range. The case of a=0.13 μm corresponds to 2R=0.2 μm as converted to the particle size, and the case of a=1.3 μm corresponds to 2R=2.0 μm as converted to the particle size.

In this way, the scattering caused by the non-uniform structure of the refractive index in the light scattering light guide basically shows a forward scattering property, but when the correlation distance a is smaller, the forward scattering becomes weak, and the tendency of scattering light in a wide range by one scattering is intensified.

When evaluating the direction characteristic of the light actually emitted from the light scattering light guide, in addition to the forward scatter property, it is necessary to consider also the total reflection condition and interface transmissivity (escape rate) on the interface of the light scattering light guide.

According to a fundamental theory of optics, when the incident angle α of the light entering the interface from the inside of the light scattering light guide having a refractive index greater than that of an external medium (air) is larger than the critical angle αc determined by the refractive index of the medium inside and outside the light scattering light guide, exit (escape of light) to outside (air layer) does not occur. Herein, the direction of the normal setting up toward the inside of the light scattering light guide with respect to the interface is supposed to be α=0°.

In PMMA (polymethyl methacrylate: refractive index 1.492), which is a typical material of the light scattering light guide used in the invention, gives αc=42°.

As described later, the refractive index of the resin material preferably used as the matrix of the light scattering light guide in the invention is in a range of 1.4 to 1.7, and the range of the critical angle αc is 36.0° to 45.6°.

Therefore, in the case of the light incident surface placed at the side surface of the light flux parallelizer as in this invention (see embodiments below), it is generally rare that the primary scattering light generated by encounter of the light entering from the light incident surface with the non-uniform structure immediately satisfies the critical angle condition and escapes from the tight exit surface to outside.

Inside the light flux parallelizer (light scattering light guide), scattering due to refractive index non-uniform structure, interface reflection, reflection by other members disposed outside, and others occur in multiplicity and in complication. Therefore, the light escaping outside (into the air lay) from the interface is a part of the light entering the interface at an incident angle satisfying the critical angle condition through such multiple and complicated phenomena.

In this period, the effect of the forward scattering property to act so as to preserve the propagation direction (nearly parallel to the interface) of light from the light incident surface as a whole is considerably weakened through the multiple and complicated phenomena. Accordingly, the light satisfying the critical angle condition is considered to be spread substantially in the propagation direction distribution. As a result, the direction characteristic of the light emitted from the light scattering light guide (light flux parallelizer) varies significantly with the angle dependence of the interface transmissivity (escape rate) on the interface of the light (light exit surface) satisfying the critical angle condition.

Generally, in the condition scarcely satisfying the critical angle condition ($\alpha<\alpha c$), the interface transmissivity is very low. For example, in the case of acrylic resin-air layer interface, it is about 40% for P polarization component, and about 20% for S polarization component. However. when the difference between the incident angle $\alpha$ and the critical angle $\alpha c$ increases, the interface transmissivity sharply rises to a considerably large value. Consequently, when the incident angle $\alpha$ is lower than the critical angle $\alpha c$ by 5° to 10° or more, the elevation of the interface transmissivity nearly ceases. At this point, the interface transmissivity is, in the case of acrylic resin-air layer interface, over 90% for P polarization component, and over 85% for S polarization component.

Hence, in the case of the acrylic resin ($\alpha c$=about 42°), the light entering from the inside of the light scattering light guide into the light exist surface an incident angle $\alpha$=35° to 40° approximately is estimated to contribute most to the light exit from the light exit surface of the light scattering light guide. The light entering the light exit surface at this incident angle $\alpha$=35° to 40° is deflected on the light exit surface according to Snell's law, and is emitted in a direction settling within a range of about 65°±10° to the normal setting up outward on the light exit surface (that is, in the direction standing up about 15° to 35° to the light exit surface).

When a material other than acrylic resin is used in the light scattering light guide, the actual refractive index of the material is in a range of about 1.4 to 1.7, and the same discussion holds true by allowing a deviation of several degrees.

What must be noted here is, however, that when the value of the correlation distance a is very small, the forward scattering property itself in each scattering is weakened, and scattering light in a wide angle range including backward scattering may occur by the primary scattering only. It means that the parallelism of the light emitted from the light flux parallelizer is weakened. In the invention, the light scattering light guide having the characteristic not allowing such phenomenon to occur obviously is used. The light flux parallelizer is composed of such light scattering light guide.

Such viewpoint is considered in the lower limit (0.06 m) of the preferred conditions mentioned above (0.06 $\mu m \leq a \leq 35$ $\mu m$). The upper limit (35 $\mu m$) is the value determined in consideration of the range of values that can be easily realized industrially. To provide the scattering light guide with scattering capability, when uniformly dispersing particles with different refractive indices in the polymer matrix, the preferred particle size range is 0.1 $\mu m$ to 54 $\mu m$ as estimated from formula (9).

Next is explained an optical meaning about the wedge section shape of the light flux parallelizer (light scattering light guide with directional emissivity) used in the surface light source device of the invention.

FIG. 3 shows the basic shape of the section of the light scattering light guide for composing the light flux parallelizer in the surface light source device of the invention, together with the mode of repetitive reflections inside.

In the diagram, reference numeral 1 denotes a light scattering light guide of directional emissivity for composing the light flux parallelizer. Reference symbol B0 shows a representative ray for representing the light emitted from a light source L and taken into the light scattering light guide 1 from a light incident surface 2. The light source L is disposed facing to the light incident surface 2 positioned at the thicker side of the light scattering light guide 1, and hence it is assumed to propagate nearly in a horizontal direction as the representative ray B0.

The behavior of this representative ray B0 is discussed. The ray B0 repeats reflections on the light exit surface 3 and the back surface 4 inclined thereto, while undergoing direction changes by scatter at a specific rate, and approaches the thin terminal portion of the light scattering light guide 1. The internal reflections on the surfaces 3, 4 are normal reflections, and the incident angle and reflection angle in each reflection are equal to each other ($\theta 1$, $\theta 2$, $\theta 3$, . . . ).

From the inclination relation of the surfaces 3, 4, the relation of $\theta 2 > \theta 4 > \theta 6$ . . . is established among the reflections on the light exit surface 3.

The interface transmissivity at each reflection position is reviewed. According to the theory mentioned above, total reflection occurs in the condition of $\theta i > \alpha c$ (critical angle: 42° on PMMA-air interface). When $\theta i$ becomes lower than $\alpha c$, the transmissivity rises sharply, and when $\theta i$ is less than a specific value (around 35° on PMMA-air interface), the transmissivity is almost constant. The diagram illustrates the mode of occurrence of exit rays B4, B6 in the relation of $\theta 2 > \alpha c > \theta 4 > \theta 6$.

Such effect should occur not only in the representative ray B0 (no-scatter light), but also in primary scattering light or multiple scatter light in a similar mode. On the whole, therefore, the light exit rate from the light exit surface 3 is heightened by this effect as going away from the light incident surface 2. When this effect is evaluated in the function f(x) of the distance x from the light incident surface 2, f(x) is an incremental function of x.

In a part close to the light incident surface 2, the approaching effect on the light source L works in both direct light and scattered light. When this approaching effect is evaluated by g(x), g(x) may be regarded as a function having a decreasing tendency about x.

Since g(x) and f(x) are in mutually canceled relation, it is expected to make uniform the exit light intensity (luminance) of the light scattering light guide 1. Besides, the number of chances of the light in the light scatter light guide 1 to enter the light exit surface 3 tends to be greater at the wall thickness side of the wedge form. This tendency intensifies the effect evaluated by the incremental function f(x).

The angle ψ formed by the surfaces 3, 4 is not particularly limited, but an example of preferred range is $0.5° \leq \psi \leq 6°$. By forming the inclined back surface 4 (or the light exit surface 3 as the case may be) in a curved surface, it is possible to adjust the increasing transition of reflection angles $\theta 1$, $\theta 2$, $\theta 3$, . . . The wedge-form section is not always required on the entire body of the light scattering light guide 1, but in order to prevent uneven brightness occurring near the light incident surface 2, the slope near the light incident surface 2 may be flattened or a reverse slope may be formed.

The effect of using the wedge sectional light scattering light guide is similarly expected when reflecting means 5 is disposed along the back surface 4. The simplest one of the reflecting means 5 is a normal reflective member such as silver foil or white sheet. In the invention, the reflection type polarization converting means (hereinafter called polarization converter) may be employed. The reflection type polarization converter is described in detail later.

The structure and configuration of the polarization separating means making use of Brewster's angle condition, and combination with polarization converter and multiple polarization process based thereon are described in the following detailed description of the preferred embodiments.

BRIEF DESCRIPTION OF THE DRAWINGS

FIG. 2 is a graph for explaining the change of intensity of forward scattering property of the light scattering light guide depending on the correlation distance a.

FIG. 6 is a graph in which the incident angle to a BK-7 plate on the axis of abscissas, and the transmissivity of one transmission of each polarization component of P, S is plotted on the axis of ordinates.

FIG. 7(A) and FIG. 7(B) are to explain a typical type and a modified type of light exit direction modifier.

FIG. 10(A) is a diagram showing a sectional shape of a corrugated polarization separating plate used in a third embodiment of the invention, and FIG. 10(B) is a magnified view of a circled area in FIG. 10(A).

FIG. 11 is a diagram for explaining the structure and use of a multilayer type polarization separating plate used in a fourth embodiment of the invention.

FIG. 20(1) is a sectional view of an entire structure, and FIG. 20(2) shows the appearance of an undulated side formed on a back surface slope of the polarization converter used therein.

FIG. 22(1) is a sectional view showing an example of polarization converter Σ. FIG. 22(2) is a see-through perspective view seen from the surface side of substrate region, by extracting and magnifying the unit element of polarization conversion unit parallel formation region.

FIG. 24(1) is a symbolized view of an undulated pattern of polarization conversion unit parallel formation region Σ'1 shown in FIG. 23(2). FIG. 24(2) is a diagram for instructing the direction from the ridge portion projecting to the back surface of the polarization converter Σ toward the substrate region Q1 by means of arrows.

FIG. 26(1) to FIG. 26(3) express two examples allowing the light incident and exit directions to be taken in a direction inclined to an extending direction of the polarization converter.

DETAILED DESCRIPTION OF THE PREFERRED EMBODIMENTS

Figure 1:
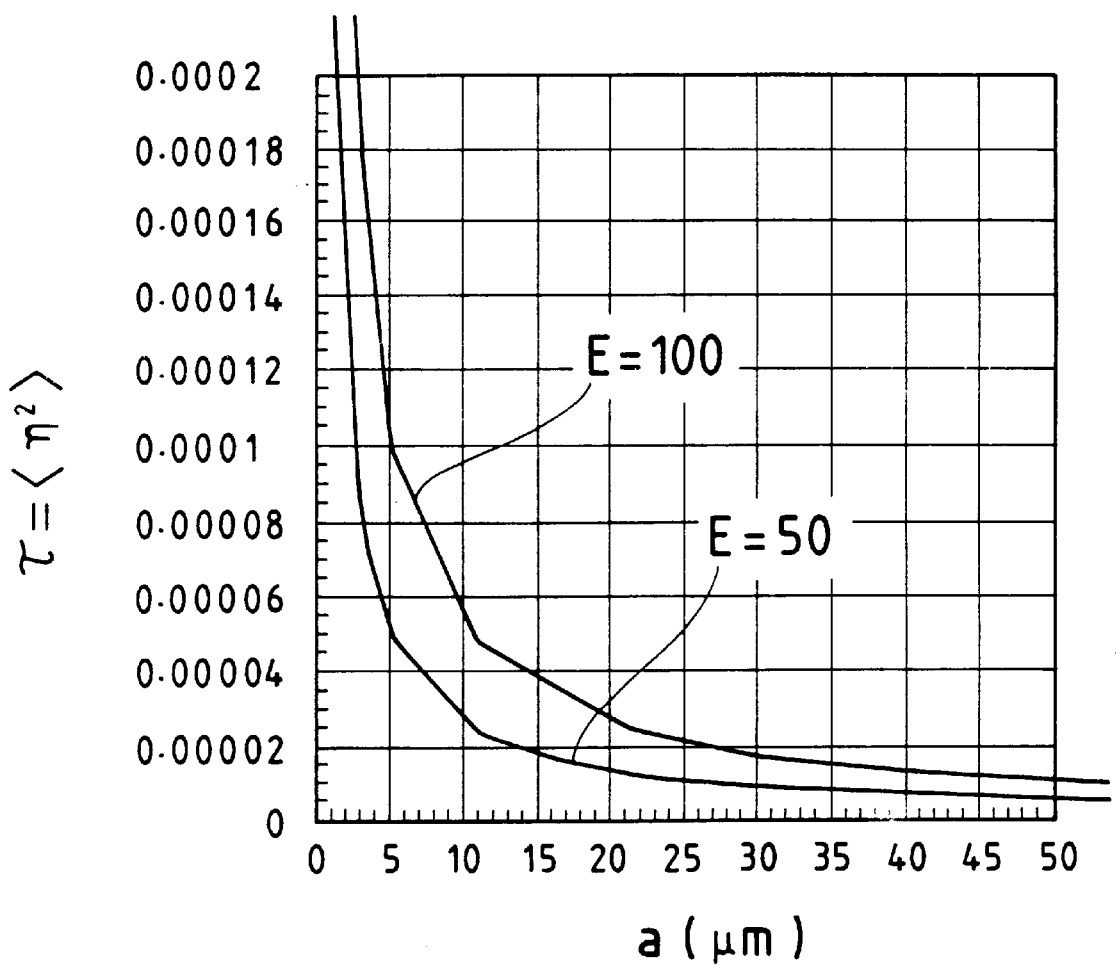
FIG. 1 is a graph showing curves for representing the conditions for making constant the effective scatter irradiation parameters E in the case of E=50[cm$^{-1}$] and E=100 [cm$^{-1}$]. The axis of abscissas denotes the correlation distance a, and the axis of ordinates indicates the dielectric constant fluctuation square mean τ.
Figure 2:
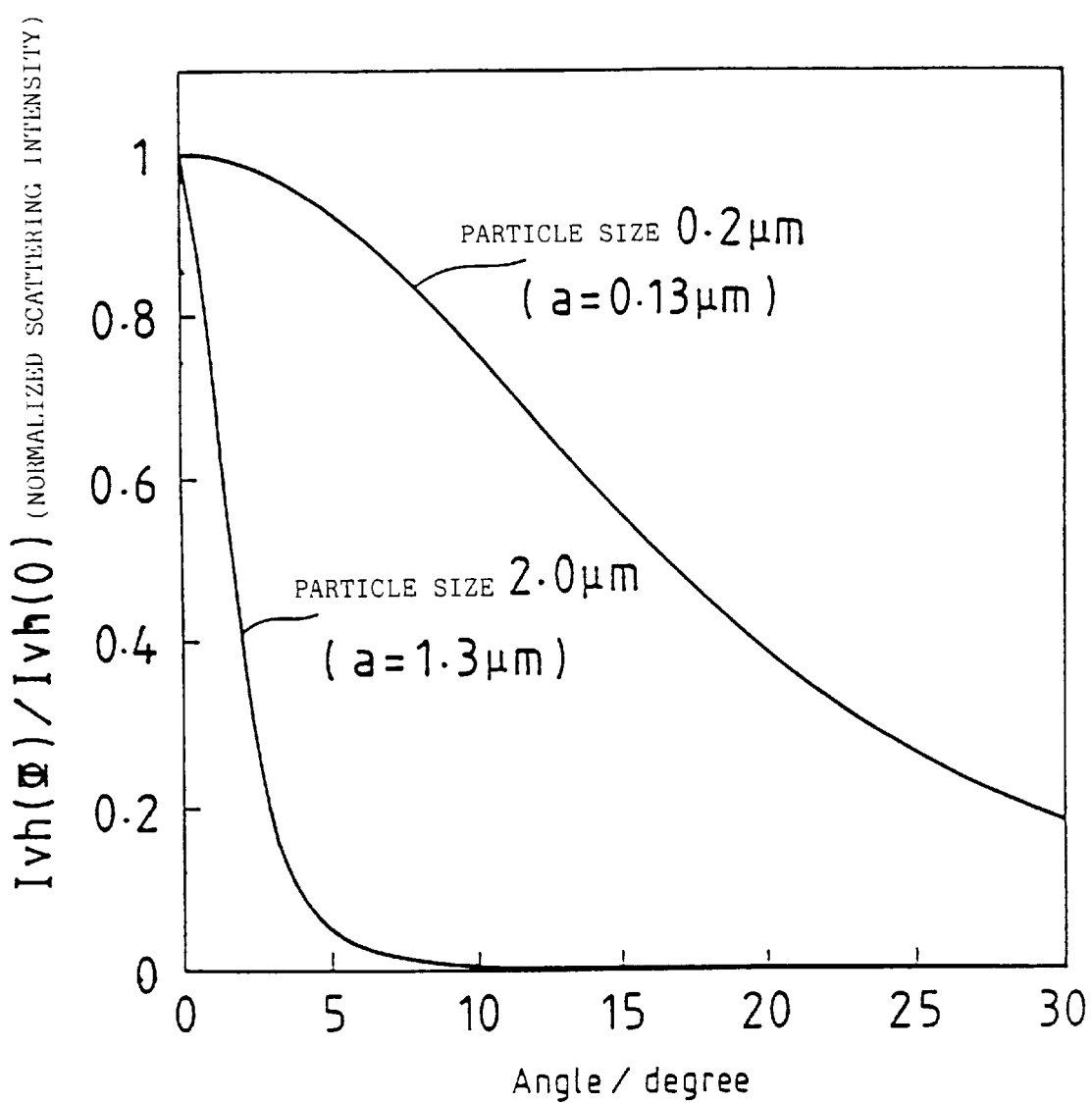
Figure 3:
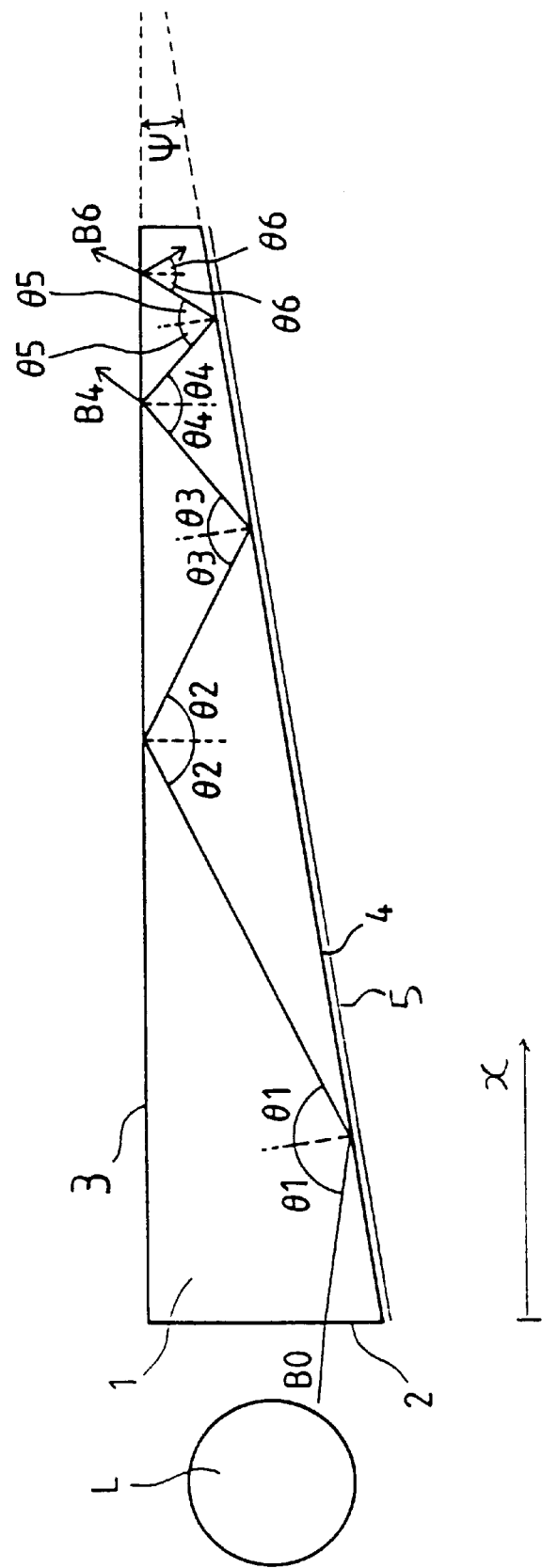
FIG. 3 shows the basic shape of the section of light scattering light guide for composing the light flux parallelizer used in the invention, together with the mode of repetitive reflections inside.
Figure 4:
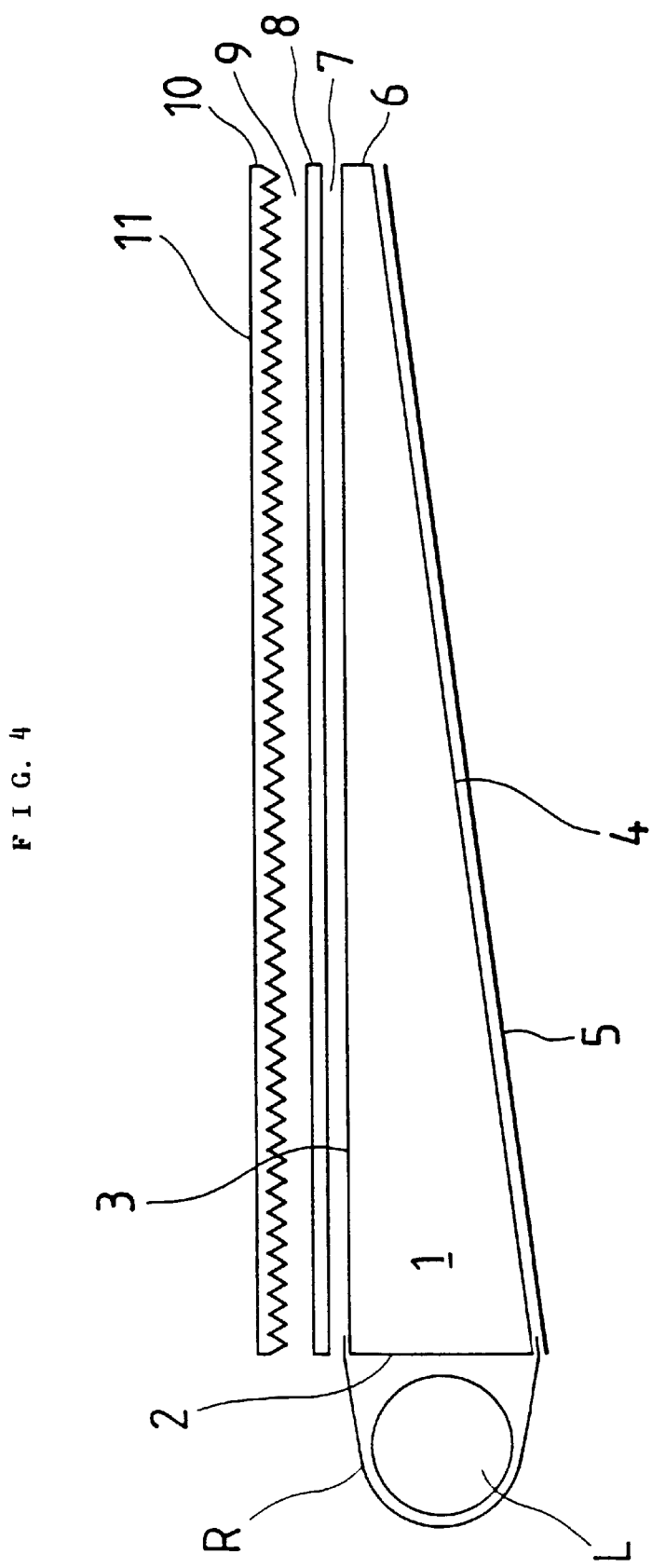
FIG. 4 is a sectional view of a first embodiment of the invention.

FIG. 4 is a sectional view of a first embodiment of the invention. In the diagram, elements common to FIG. 3 are directed by the same reference numerals. Reference symbol 1 denotes a light flux parallelizer (made of a light scattering light guide of directional emissivity having a sectional wedge; same hereinafter). As the material for the light flux parallelizer, particles of silicon resin material (diameter 2 μm, refractive index=1.4345) are uniformly dispersed at a rate of 0.07 wt. % in polymethyl methacrylate (PMMA).

The light flux parallelizer 1 has the length of 68 mm in the lateral direction in the diagram, and the width of 85 mm, and measures 4.0 mm at the end of the light incident surface 2 side, and 0.2 mm at the end portion 6.

Reference code L denotes a fluorescent lamp of 3 mm in diameter, disposed at a distance of 1 mm from the light incident surface 2 of the light flux parallelizer 1. When light enters to the right from this fluorescent lamp L, a parallelized light flux is taken out from the light exit surface 3. Reference code R represents a reflector (silver foil) disposed so as to maximize the quantity of light entering from the light incident surface 2, and is located so as to surround the fluorescent lamp L.

The back surface 4 of the light flux parallelizer 1 is not particularly treated for causing intense light scatter such as light diffusion ink pattern or corrugated diffusion surface. Reference numeral 5 is a reflector made of silver foil sheet disposed opposite to the back surface 4, and is intended to return the light emitted from the back surface 4 into the light flux parallelizer 1.

At the position confronting the light exit surface 3 of the light flux parallelizer 1 across an air layer 7, a polarization separating plate 8 is disposed as polarization separating means, and further at the outer side is disposed an exit light direction modifier 10 across an air layer 9. Reference numeral 11 is a light exit surface of the exit light direction modifier 10, and is also is a light exit surface as the surface light source device. When using the surface light source device as the backlight source of a liquid crystal display, a liquid crystal display panel is disposed at a further outside of the exit light direction modifier 10.

The polarization separating plate 8 is a plate made of transparent optical material, and is, for example, a flat plate member of 1 mm in thickness made of a representative optical glass BK-7 (refractive index 1.5163). At the refractive index n0=1 of the air layer 7, the Brewster's angle is 56.60°.

Figure 5:
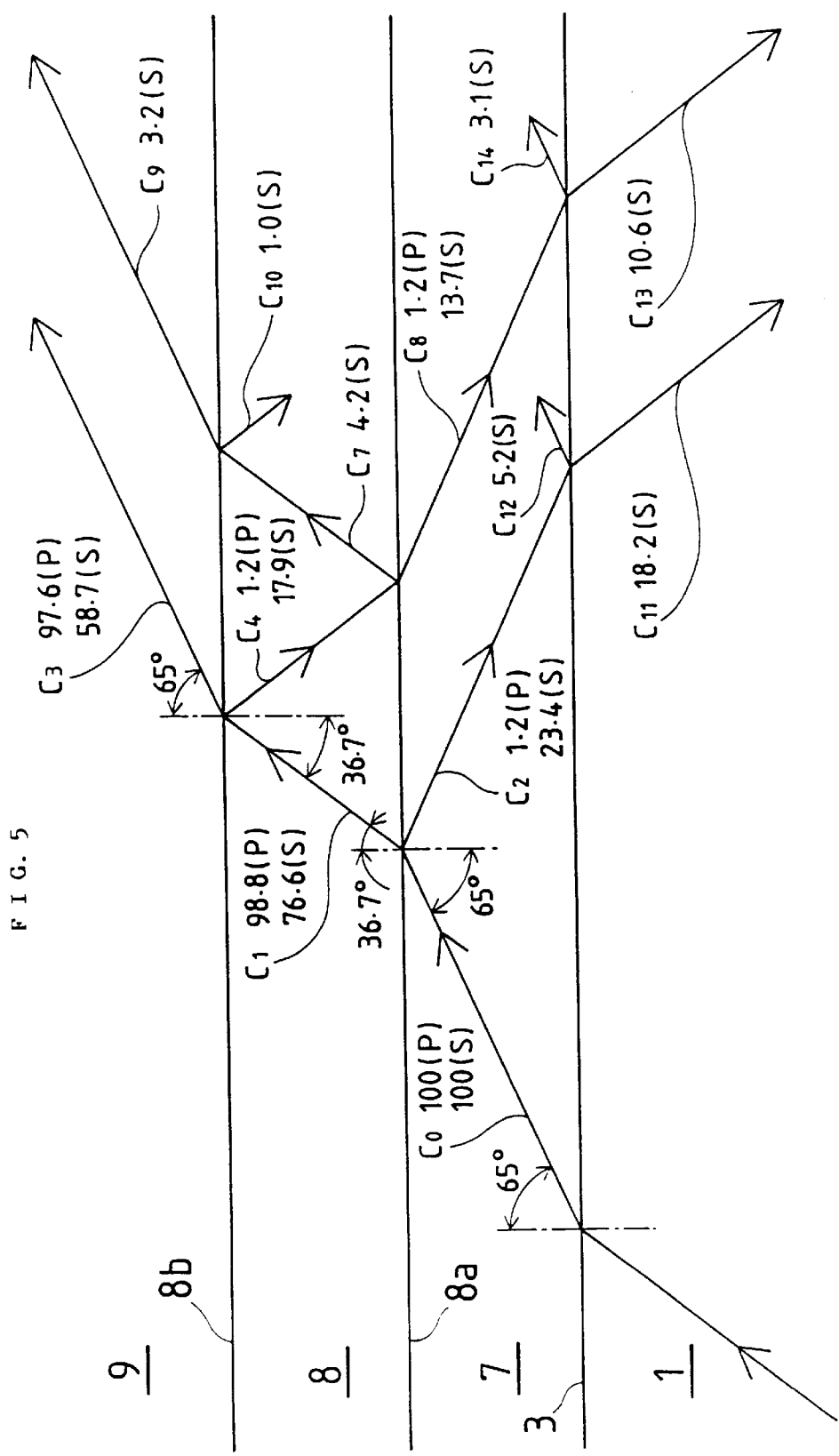
FIG. 5 is a diagram for explaining the behavior of the light emitted from a light flux parallelizer 1.

Referring further to FIG. 5 and FIG. 6 sequentially, the outline of the polarizing function in the first embodiment combining the polarization separating plate 8 and light flux parallelizer 1 is described below.

In FIG. 4, the irradiation light of the fluorescent lamp L and the reflected light from the reflector R enter the light flux parallelizer 1 from the light incident surface 2, and is guided toward the end portion 6 of the light flux parallelizer 1 while undergoing scattering by the refractive index non-uniform structure (particles of different refractive indices herein) inside the light flux parallelizer 1. In this process, light is gradually emitted from the light exit surface 3. As mentioned above, the exit light is parallelized into flux and has a directivity. This parallel light flux is represented by ray C0, and the behavior of light emitted from the light flux parallelizer 1 is shown in ray tracing form in FIG. 5.

In the case of using PMMA as the matrix of the light flux parallelizer 1, a strong light exit occurs in a direction of about 65° as measured from the normal H0 set up on the light exit surface 3. Accordingly, the exit angle of the representative ray C0 is supposed to be 65°.

The representative ray C0 emitted from the light exit surface 3 of the light flux parallelizer 1 runs straightly through the air layer 7 and enters a lower surface 8a of the polarization separating plate 8, and is divided into ray C1 invading into the polarization separating plate 8 and ray C2 reflected and returning to the light flux parallelizer 1. The ray C1 is deflected by the surface 8a, and runs straightly through the polarization separating plate 8, reaches an upper surface 8b of the polarization separating plate 8, and is divided into an external exit ray C3 and an internal reflected ray C4. The internal reflected ray C4 further returns to the lower surface 8a, and is divided again into an internal reflected ray C7 and a ray C8 advancing into the air layer 7. The internal reflected ray C7 reaches the upper surface 8b and is divided further into an external exit ray C9 and an internal reflected ray C10. The internal reflected ray repeats the same process hereinafter.

On the other hand, the rays C2 and C8 running straightly into the light flux parallelizer 1 are divided into rays C11, C13 to enter again the light flux parallelizer 1 and reflected rays C12, C14 on the light exit surface 3. The reflected rays C12, C14 are directed again to the polarization separating plate 8, and follow the same process as C0.

Throughout such process of multiple reflection/transmission, the light energy of ray C0 is also divided and distributed into reflected ray and transmitted ray on the interfaces 3, 8a, 8b. The distribution ratio differs largely between the P polarization component and S polarization component. The internal light transmissivity of the 1 mm thick BK-7 plate for composing the polarization separating plate 8 is over 99.9%, and its absorption loss is as small as negligible. Accordingly, supposing the ray C0 to be spontaneous light with 0 degree of polarization, equivalently possessing 100 each of energy of P polarization component and energy of S polarization component, the energy quantity of each polarization component of rays C1 to C14 is calculated, and the result is shown in the diagram.

For example, when the ray C0 is divided into C1 and C2, the transmissivity of P polarization component is extremely high, showing 98.8%, but the transmissivity of S polarization component is only 76.6%. Therefore, the ray C2 is a light polarized almost only in S polarization component. That is, in a range deviated about 10° from Brewster's angle of 56.60° of BK-7, the Brewster's angle condition is maintained approximately, and hence the S polarization rate of the reflected ray C2 is extremely high (if the incident angle of C0 coincides with Brewster's angle 56.60°, the S polarization rate of reflected ray C2 is, as a matter of course, 100%).

When the ray C1 enters the upper surface 8b of the polarization separating plate 8, the reflectivity of each polarization component is 1.2% in P polarization component, and 23.4% in S polarization component. Therefore, the energy quantity of each polarization component of the ray C3 emitted outside is 97.6 of P component and 58.7 of S component, and a considerable degree of polarization is known. The result of similar calculation on C4 and others is shown in the diagram. As clear from these values, as the ray division is repeated, the energy quantity of P and S polarization components decreases sharply. Approximately estimating the energy quantity of each polarization component of external exit light from the rays C3 and C9 shown in FIG. 5, we obtain P polarization component=97.6, and S polarization component=61 9.

Thus, even by considering only the rays shown in FIG. 5, it is understood that a considerably polarized exit light flux is obtained. The invention is, however, not intended to achieve the polarization function by depending on such process only. The invention is intended to further enhance the degree of polarization of final exit light by re-utilizing the light returned to the light flux parallelizer (hereinafter called return light) from the polarization separating means (BK-7 plate in the first embodiment) disposed opposite to the light exit surface of the light flux parallelizer.

Referring to the example in FIG. 5, as known from the numerical values attached to the rays C11 and C13, the return light is almost a complete S polarization light. This return light undergoes the process of scatter, reflection and others again in the step of propagating in the light scattering light guide composing the light flux parallelizer 1, and the majority is emitted from the light exit surface 3.

Discussing the exit directivity at this time, although not so much as when entering from the light incident surface 2, on the whole, the forward scatter property toward the right in FIG. 3 is preserved, and there is still a weak directivity capable of representing by the exit direction of the ray C0.

The rays C11 (S polarization component 18.2) and C13 (S polarization component 10.6) mostly composed of S polarization component are disturbed in the polarization direction as undergoing the process of scattering, reflection and others in the light flux parallelizer. Hereinafter, the effect of disturbing the polarization characteristic is called polarization scramble effect. By this polarization scramble effect, it is estimated that the S polarization degree of the exit light from the light exit surface 3 derived from C11 or C13 is considerably lowered.

If the polarization scramble effect is perfect, assuming to be emitted again from the light exit surface 3 without loss, the energy quantity is P polarization component 9.1, S polarization component 9.1 as for C11 derivative, and P polarization component 5.3, S polarization component 5.3 as for C13 derivative.

Summing them up yields P polarization component=14.4, S polarization component=14.4. If this light follows the same history as C0, the energy quantity of (14.4/100)×97.6= 14.1 is added to the P polarization component of the exit light flux from the upper surface 8$b$ of the polarization separating plate 8. Therefore, the final P polarization component energy quantity approximately estimated from this model is 97.6+14.1=111.7. Similarly, the S polarization component energy quantity is 61.9+(61.9/100)×14.1=70.6.

Part of the light flux emitted from the light exit surface 3 of the light flux parallelizer 1 is S polarized to be return light, and at least part thereof is non-polarized in the light flux parallelizer 1 and emitted again from the light exit surface 3 of the light flux parallelizer 1, and undergoes S polarization elimination action again by the polarization separating plate. In this invention, such cyclic polarization process is utilized. Accordingly. as shown in the above case, in principle, it is possible to amplify the P polarization component contained in the spontaneous light to over 100%. Such feature is intrinsic of the invention, and is a common feature found in the other embodiments mentioned below.

In the description of the first embodiment, meanwhile, the (first) exit light of the light flux parallelizer 1 is represented by C0 with exit angle of 65°, but the nature of this phenomenon hardly changes if the condition of the exit angle varies about 10°. FIG. 6 is a graph for understanding this. The axis of abscissas denotes the incident angle to the BK-7 plate (=exit angle from the light exit surface 3). The axis of ordinates expresses the transmissivity of one transmission of each of P and S polarization components (total exit energy from 8$b$/total incident energy into 8$a$; re-entrance of return light is not taken into consideration).

As known from the graph, almost in the almost whole range of 55° to 75°, the transmissivity of P polarization component exceeds about 80%, and the transmissivity of S polarization component is lower than it by about 20% or more. Therefore, if there is a certain variation in the propagation direction of the exit light flux from the light exit surface 3, it may be understood that no modification is required in the essential portion of the above explanation.

As known from the explanation of the process of polarization, the directivity characterized by the large exit angle (65° in this example) of the representative ray C0 also remains in the exit light flux from the polarization separating means 8. By modifying it, in order to realize a priority light exit into a required direction (for example, front direction) in ordinary application (for example, backlight for liquid crystal display), an exit light direction modifier may be utilized.

In FIG. 4, the exit light direction modifier 10 disposed outside of the polarization separating plate 8 has a function of modifying the propagation direction of the directive light flux emitted from the light exit surface 8$b$ of the polarization separating plate 8 in a front direction through a prism action.

Referring also to FIG. 7(A), (B), the exit light direction modifying function of this exit light direction modifier is explained below.

FIG. 7(A) is a diagram for explaining a typical structure and configuration of the exit light direction modifier, and FIG. 7(B) shows a configuration of a modified type. In both diagrams, tracing routes of rays C3, C9 are added to the extracted and magnified sectional views of the peripheral parts of the polarization separating plate and exit light direction modifier in the configuration shown in FIGS. 4 and 5.

In both diagrams, the exit light direction modifiers 10, 10' are made of optical material such as polycarbonate (PC; refractive index npr=1.59), and multiple prism surfaces 10$a$, 10$b$ (top angle θpr) or 11$a$, 11$b$ (top angle θ'pr) are formed on one surface.

The prism forming surface of the exit light direction modifiers 10, 10' may be used as the light incident surface as shown in FIG. 7(A). To the contrary, it may be also used as the light exit surface as shown in FIG. 7(B).

First, FIG. 7(A) is described. From the related explanation in FIG. 5, it is considered that the rays C3, C9 emitted at an exit angle of 65° to the light exit surface 8$b$ of the polarization separating plate 8 nearly represent the light flux emitted from the polarization separating plate 8, being derived from the representative ray C0. These representative rays C3, C9 run straightly through the air layer 9 (refractive index n0=1.0), and enter the prism surface 10$a$ of the exit light direction modifier 10 at an angle close to the vertical direction.

The rate of the quantity of light entering the prism surface 10$b$ is considered to be relatively small. The representative rays C3, C9 run almost straightly up to the prism surface 10$b$, and are normally reflected, and enter the flat light exit surface 11 of the exit light direction modifier 10 at an angle close to the vertical direction, and are emitted as a light flux D from the surface 11 at an angle close to the vertical direction.

By setting, for example, the inclination angle θa of the incident side prism surface 10$a$ so that light fluxes C3, C9 may enter almost vertically (herein θa=25°), and setting the inclination angle θb of the other prism surface 10$b$ so that the internal reflected light may enter the flat light exit surface 11 almost vertically (herein θb=65°/2=32.5°), the direction of light flux D may be matched with the vertical direction. Thus, by selecting the inclination angle of the prism surfaces, the direction characteristic of the light flux D can be adjusted.

FIG. 7(B) is a sectional view explaining the behavior of representative rays C3, C9 in the case of the exit light direction modifier 10' disposed so that its prism surfaces 11$a$, 11$b$ may be directed to outside. Same as in the case of FIG. 7(A), the representative rays C3, C9 run straightly through the air layer 9 (refractive index n0=1.0), and enter the flat surface 10'$a$ of the exit light direction modifier 10' at an inclined angle, and are deflected upward. The majority is emitted from the prism surface 11$b$ of the opposite side as light flux D" at an angle close to the vertical direction. Depending on the refractive index of the material for composing the exit light direction modifier 10' or the values of inclination angles θ'$a$, θ'$b$ of the prism surfaces 11$a$, 11$b$, it may be also possible to use optical paths once emitted into the air from the prism surface 11$b$, reflected normally on the opposing prism surface 11$a$ and directing toward the front direction.

Thus, when either configuration of FIG. 7(A) or FIG. 7(B) is applied to the configuration in FIG. 4, by properly selecting the inclination angle of the prism surface, the light exit direction can be controlled in a considerable range.

In the exit light direction modifiers 10, 10', not limited to the illustrated example of forming prisms surface in a row, any form may be applied. For example, a film distributing protrusion groups of triangular conical form or dome form, or a plate element having a row of protrusions with a semicircular section may be considered. Or, a plurality of pieces may be laminated and used.

Figure 8:
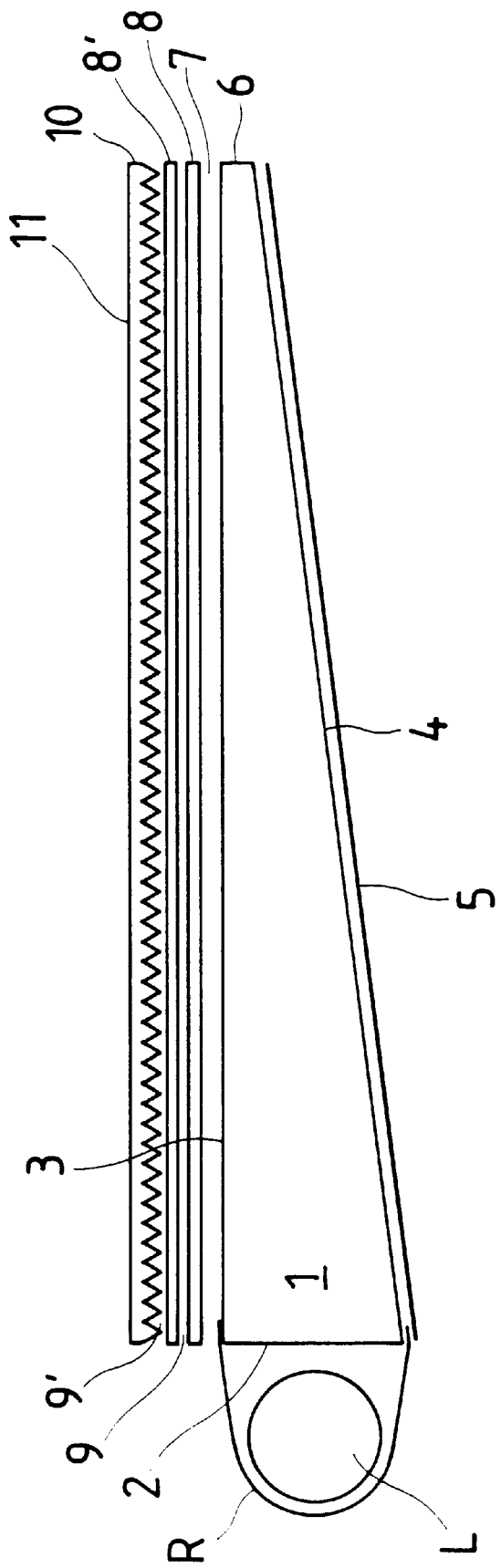
FIG. 8 shows a second embodiment of the invention in a same manner as in FIG. 4.

A second embodiment of the invention is described below. FIG. 8 shows the second embodiment of the invention in a same manner as in FIG. 4. In the diagram, elements common to FIG. 4 are identified with the same reference numerals. The second embodiment is exactly same in constitution as the first embodiment, except for the parts related with the polarization separating means 8, 8'. The explanation is omitted for the common parts, and the parts relating to the polarization separating means are described.

The polarization separating means employed in the second embodiment comprises two polarization separating plates 8, 8' disposed parallel along the light exit surface 3 of the light flux parallelizer 1. The polarization separating plates 8, 8' are made of optical material small in absorption loss, and both are, herein, made of plate materials of 1 mm thick PMMA (polymethyl methacrylate; refractive index 1.492, Brewster's angle=56.17°). The absorption loss of internal transmission is 0.01% or less, and it can be ignored same as in the case of BK-7.

The inner polarization separating plate 8 and outer polarization separating plate 8' are spaced by 0.5 mm from each other by a proper spacer (not shown), and the air layer 9 is kept in this spacing. On the outside of the outside polarization separating plate 8', an exit light direction modifier 20 same as in the first embodiment is disposed across an air layer 9'.

Figure 9:
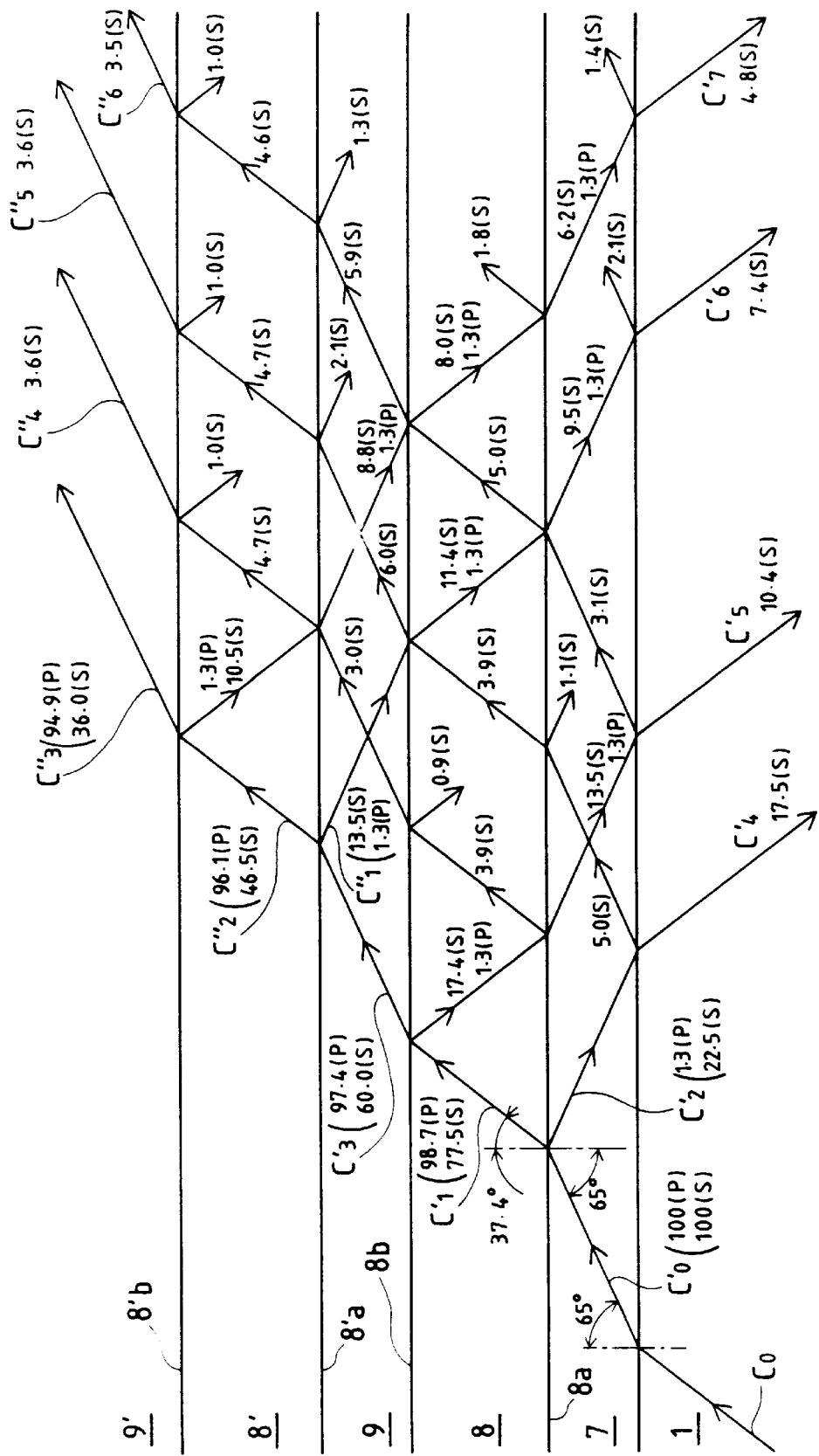
FIG. 9 is a diagram for explaining the outline of polarizing function in the second embodiment, combining two polarization separating plates and a light flux parallelizer.

FIG. 9 is a diagram for explaining the outline of the polarization function in the second embodiment. Same as in the case of FIG. 5, parallel light flux emitted from the light exit surface 3 of the light flux parallelizer 1 is represented by ray C0' with exit angle of 65°. The behavior of the light emitted from the light flux parallelizer 1 is described in the ray tracing format. The energy quantity propagated at the time of branching into each ray is also described in the same descriptive manner as in FIG. 5 (P polarization component of ray C0'=S polarization component=100).

The representative ray C0' runs straightly through the air layer 7, enters the lower surface 8a of the first polarization separating plate 8, and is divided into ray C1' invading into the polarization separating plate 8, and ray C2' reflected and directing again toward the light flux parallelizer 1. The rays C1', C2' thereafter run through various branching routes as shown in the diagram, partly going into the inner surface 8a' of the second polarization separating plate 8' through the air layer 9, and partly entering the light flux parallelizer 1 as return light.

The process in this period is exactly same as in the first embodiment shown in FIG. 5, except for the portion related with the second polarization separating plate 8', and detailed description is omitted. However, the refractive index of the polarization separating plate 8 made of PMMA is slightly different from that of the first embodiment (BK-7), and therefore the refractive angle when entering and leaving the interfaces 8a, 8b slightly changes, and hence the dividing rate of P polarization component and S polarization component is slightly different.

The ray C3' emitted from the first polarization separating plate 8 reaches the inner surface 8'a of the second polarization separating plate 8', and is divided into the rays C2" and C1" invading into the polarization separating plate 8'. The subsequent route is nearly same as in the case of the first polarization separating plate 8. A considerable portion of the ray getting into the air layer 9 from the inside of the polarization separating plate 8' through the inner surface 8'a enters the outer surface 8b of the first polarization separating plate 8, partly returning to its inside and partly reflected to go again toward the second polarization separating plate 8', and it should be noted that such route is formed in multiples.

In this period, it is estimated that the phenomenon of part of the light returning to the first polarization separating plate 8 returning further to the light flux parallelizer 1 may be induced, if only very slightly.

When two (or more) polarization separating plates 8, 8' are disposed as polarization separating means, the ray route is branched very complicatedly, and hence it is difficult to calculate strictly the quantity of P and S polarization components finally emitted from the outer surface of the second polarization separating plate 8'.

Accordingly, by making use of the fact that the propagated energy quantity is gradually decreased every time the ray path is branched, an approximate calculation was performed in a shown route range. From the integrated value of the numerical values of rays C"3 to C"6, P polarization component=94.9 and S polarization component=46.7 are evaluated.

Comparing them with the corresponding numerical values in the first embodiment, P polarization component=97.6, S polarization component=61.9 (note that the effect due to difference in material of polarization separating plate is small), it is found that the extracted and stored state of the P polarization component is excellent in both cases, while the S polarization component is decreased notably.

As known from this fact, when taking out the light emitted from the light flux parallelizer 1 at around 65° through one or more polarization separating plates, the S polarization component is eliminated by about 30 to 40% through every piece of polarization separating plate, while maintaining the majority of the P polarization component.

In addition to this P polarization preservation/S polarization elimination phenomenon, the recycle process already mentioned in relation to the first embodiment will act. That is, the return light rich in S polarization component returns into the light flux parallelizer, and the polarized state is scrambled, and the P polarization preservation/S polarization elimination action of the polarization separating plate (one or two or more) will act again, so that the P polarization component is further enriched.

Evaluating the quantity of return light (S polarization component) in the second embodiment from the data attached to FIG. 9, we obtain 17.5+10.4+7.4+4.8 =40.1. If the polarization scramble action of the light flux parallelizer 1 is perfect, a re-exit light from the light flux parallelizer having about 20 of P polarization component is obtained. When 94.9% thereof is preserved and emitted from the second polarization separating plate 8', about 19 of polarization component will be added.

Adding it to 94.9 of the return light exclusion evaluation, finally a polarization output containing about 114 of P polarization component will be obtained.

Using only two polarization separating plates, the directivity of the exit light flux composed of rays C3" to C6" will not be broken notably. Therefore, in the second embodiment, too, nearly the same exit light direction modifying action as in the first embodiment is exhibited by the exit light direction modifier 10 disposed in the next stage of the second polarization separating plate 8'. A polarized light flux propagated from the light exit surface 11 of the exit light direction modifier 10 in the front direction is emitted.

Concerning the polarization separating plate used in the foregoing embodiments, a third embodiment of the invention is realized by further improving so as to further enhance the degree of satisfaction of the Brewster's angle condition at the time of light incidence. The entire constitution of the third embodiment is similar to the first embodiment shown in FIG. 4, except for the structure of the polarization separating plate itself. Accordingly, omitting the description of the entire constitution, the polarization separating plate 8 of flat plate type in FIG. 4 or FIG. 5 is read as a polarization separating plate 8'' of corrugated sectional structure shown in FIG. 10 (hereinafter called corrugated polarization separating plate). As shown also in the same diagram, the exit light flux from the light flux parallelizer 1 is represented by representative ray C0 with exit angle 65°.

FIG. 10(A) shows a sectional shape of the corrugated polarization separating plate 8''. As shown in the diagram, a corrugated shape of equal thickness is formed by repetition of relatively short steep slopes 81, 83 and relatively long moderate slopes 82, 84. The material for composing this corrugated polarization separating plate 8'' is a light permeable material having a proper refractive index. Herein, PMMA (polymethyl methacrylate; refractive index 1.492, Brewster's angle 56.17°) is used.

FIG. 10(B) is a magnified view of the circled portion in FIG. 10(A) (one unit portion of repeated shape). The diagram also records the ray tracing diagram of the ray C0 representing the exit light flux from the light flux parallelizer 1. An intrinsic feature of this embodiment lies in that the inclination of the incident side 82 of the moderate slope is selected so as to satisfy the Brewster's angle condition about the representative ray C0.

The inclination angle of the surface 82 is set at 9° to the surface M parallel to the light exit surface 3 so that the incident angle of the representative ray C0 having an exit angle of 65° to the normal N set up on the light exit surface 3 of the light flux parallelizer 1 coincides with the Brewster's angle 56° (approximate).

In this angle condition, the P polarization component contained in the reflected ray R1 branched off from the representative ray C0 is theoretically 0, and hence all P polarization component will pass through the surface 82. In particular, in comparison with the first or second embodiment, it is advantageous that the transmissivity of the surfaces 82, 84 of P polarization component is high even in the light of which exit angle from the light exit surface 3 of the light flux parallelizer 1 is close to right angle (more lying direction).

The ray T1 containing much P polarization component invading inside the corrugated polarization separating plate 8'' is branched on the confronting slope 84 into internal reflected ray T2 and exit ray T3 having an exit angle of 65°, and P polarization component is hardly contained in the internal reflected ray T2 (see the data attached to ray C2 in FIG. 5 or ray C2' in FIG. 9).

The internal reflected ray T2 is further branched on the surface 82 into internal reflected ray T4, and ray R2 directing toward the light flux parallelizer 1. Hereinafter, the process of internal reflection/exit repeated in multiples is similar to that explained in the first embodiment (especially FIG. 5), and the energy quantity carried along with the progress of the progress is suddenly decreased.

Therefore, according to the constitution of the embodiment, it is characteristic that the loss of the P polarization component by placing the polarization separating plate 8'' is extremely small. By the polarization light scramble effect on the return light same as explained in the first and second embodiments, and the further addition of the P polarization component by the re-exit from the light flux parallelizer 1, the exit light containing more P polarization component can be generated. By disposing the exit light direction modifier 10 relating to the exit light from the surface 84, needless to say, the exit light direction modification same as in the first and second embodiments is realized.

The inclination angle of the steep slopes 81, 83 is preferred to be set at an angle so as to be parallel to the direction of the representative ray C0 so that the exit light from the light flux parallelizer 1 may not enter as far as possible. Herein, it is defined as 90°–65°=25°. Nothing is particularly limited about the repetitive period of the steep slopes 81, 83 and moderate slopes 82, 84.

Generally, however, the period is preferred to be short from the viewpoint of suppressing the thickness measured between the ridges 85 and 86, and keeping uniformity of brightness as the surface light source. Herein, the repetitive period is selected so that thickness measured between the ridges 85 and 86 may be 0.5 mm.

A fourth embodiment of the invention is described below, in which a polarization separating plate having a multilayer film made of materials with different refractive indices is used as the polarization separating means. The entire constitution of the embodiment, except for the structure of the polarization separating plate itself, is similar to the first embodiment shown in FIG. 4. Herein, omitting the description of the entire constitution, it is assumed that the polarization separating plate of flat plate type in FIG. 4 or FIG. 5 is read as a multilayer type polarization separating plate 18 shown in FIG. 11.

As shown also in FIG. 11, assuming that the exit angle of the exit light flux from the light flux parallelizer 1 is deviated slightly to the higher angle side (lying direction), the state represented by a representative ray D0 having an exit angle of 70° is supposed. As mentioned earlier, the axis of the exit direction of the exit light flux from the light exit surface 3 of the light flux parallelizer 1 is variable from several degrees to about ten degrees, depending on the values of the refractive index of the light scattering light guide for composing the light flux parallelizer 1 or correlation distance a and the like.

The multilayer type polarization separating plate may have a structure of laminating thin films of several (at least two, in principle) to scores of layers, in the condition of using transparent materials of different refractive indices for materials of adjacent layers. FIG. 11 shows the section of three layers and a principal optical path of representative ray D0.

The multilayer type polarization separating plate 18 comprises, sequentially from the incident side, a titanium dioxide (TiO2; refractive index n1=2.3) layer 181, a silicon dioxide (SiO2; refractive index n2=1.46) layer 182, and a titanium dioxide (TiO2; refractive index n3=n1=2.3) layer 183, and thereafter titanium dioxide layer and silicon dioxide layer are alternately laminated according to the total number of layers. It may be also possible to laminate with a layer of a material further different in refractive index (for example, a layer of zirconium dioxide ZrO2, titanium oxide TiOx having a general number of oxidations).

The principle of polarization separation of such multilayer type polarization separating plate 18 makes use of the difference in reflection characteristics between S polarization component and P polarization component at the interface formed between materials of different refractive indices, and in this respect it has common features with the polarization separating means in the first to third embodiments.

As shown in FIG. 11, when the representative ray D0 representing the exit light flux from the light flux parallelizer 1 enters the first layer 181 from the air layer 7 (refractive index n0=1.0) at a relative intensity of S polarization component Is=100, P polarization component Ip=100, ray D1 invading into the layer 181 and reflected ray D2 occurs.

The reflectivity at this time is Rs=51.8% as for S polarization component. and is extremely small, Rp=0.55%, as for P polarization component. That is, only about half of the S polarization component invades into the first layer 181, but almost all of P polarization component passes through the interface and invades into the first layer 181.

When this ray D2 reaches the interface to the second layer, it is branched again into rays D3 and D4. The reflectivity at this time is Rs (S polarization component)= 0.3%, Rp (P polarization component)=1.9%. That is, about 90% of the S polarization component gets into the second layer 182, while about half of the P polarization component passes through the interface to get into the second layer 182.

Similarly, on the interface of the second layer 182 and third layer 183, branching into D5 and D6 occurs, and the reflectivity at this time is Rs (S polarization component)= 9.3%, Rp (P polarization component)=1.9%.

Thus, every time encountering the interface, the majority of the P polarization component is propagated to the next layer, while a considerable portion of the S polarization component is eliminated. Assuming the effect of multiple reflection and absorption loss to be small, the polarization components when getting into the third layer in this case are estimated, that is, S component: Is=39.7, P component: Ip=95.7. When the number of layer is further increased. the values of Is and Ip are considered to decrease in geometrical progression.

Supposing the average common ratio at this time to be rs (S polarization component) and rp (P polarization component), their relation is rs<rp, and rp is slightly less than 1.

Therefore, the greater the number of layers for composing the multilayer type polarization separating plate 18, the higher becomes the "purity" of the P polarization component, it is considered. Such tendency is established not only at the exit angle of the representative ray D0 of 70°, but also in the considerably wide angle condition.

Figure 12:
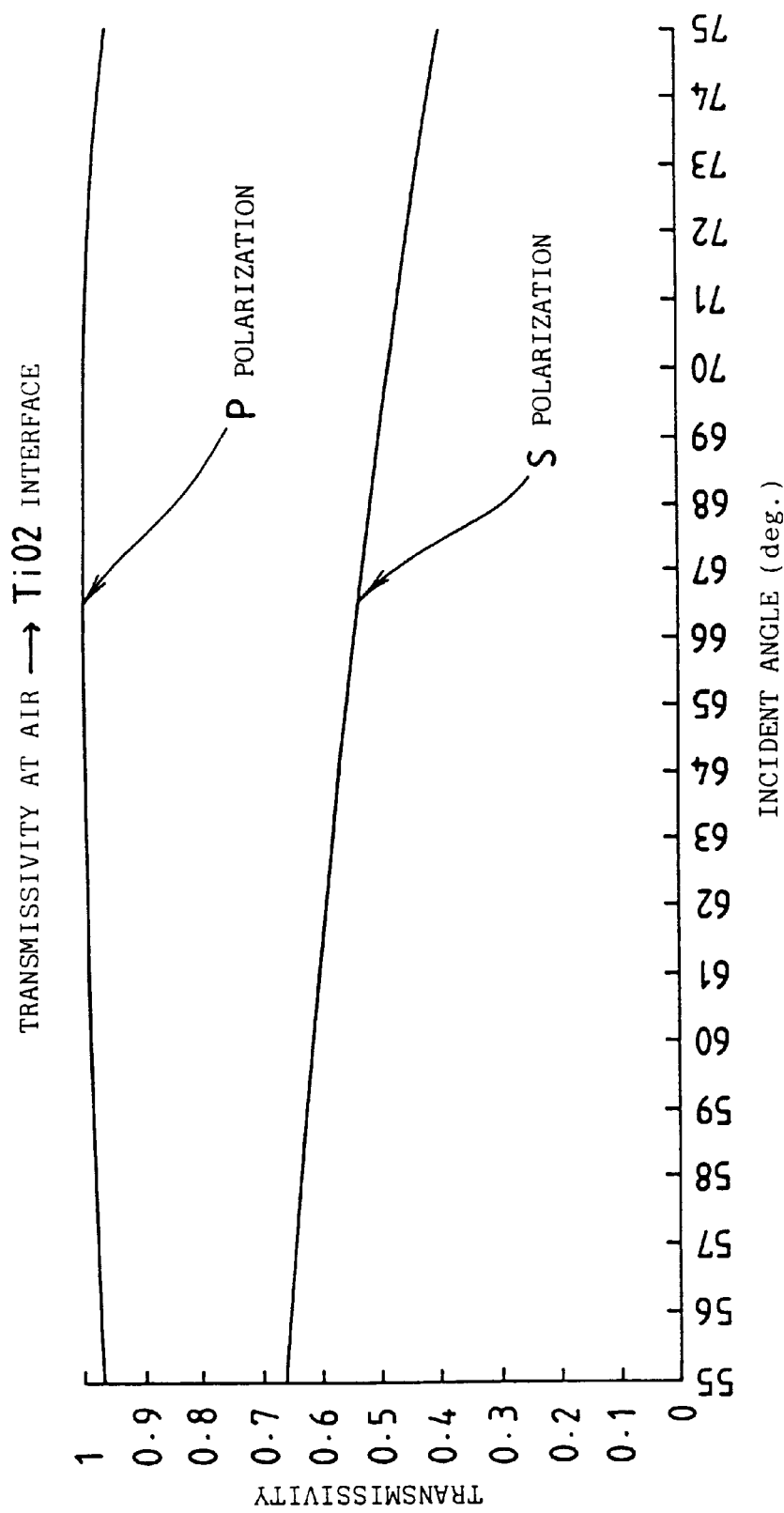
FIG. 12 is a graph expressing the transmissivity of each polarization component on the interface of an air layer and a first layer in the structure shown in FIG. 11 by the function of an incident angle.
Figure 13:
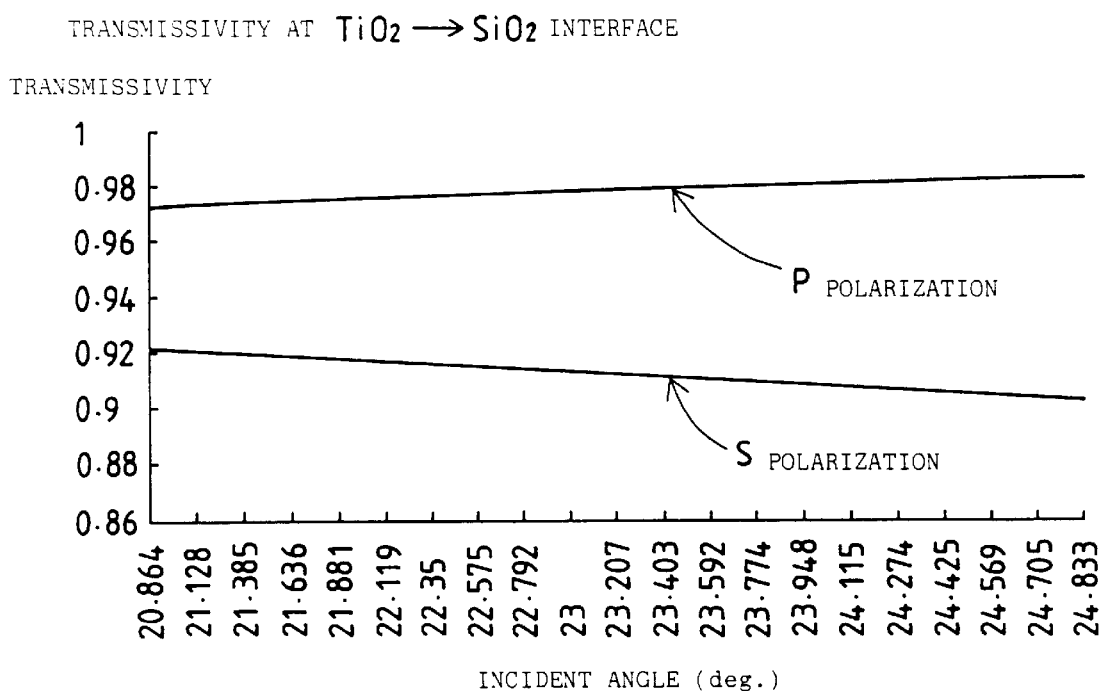
FIG. 13 is a graph expressing the transmissivity of each polarization component on the interface of the first layer and second layer in the structure shown in FIG. 11 by the function of an incident angle.
Figure 14:
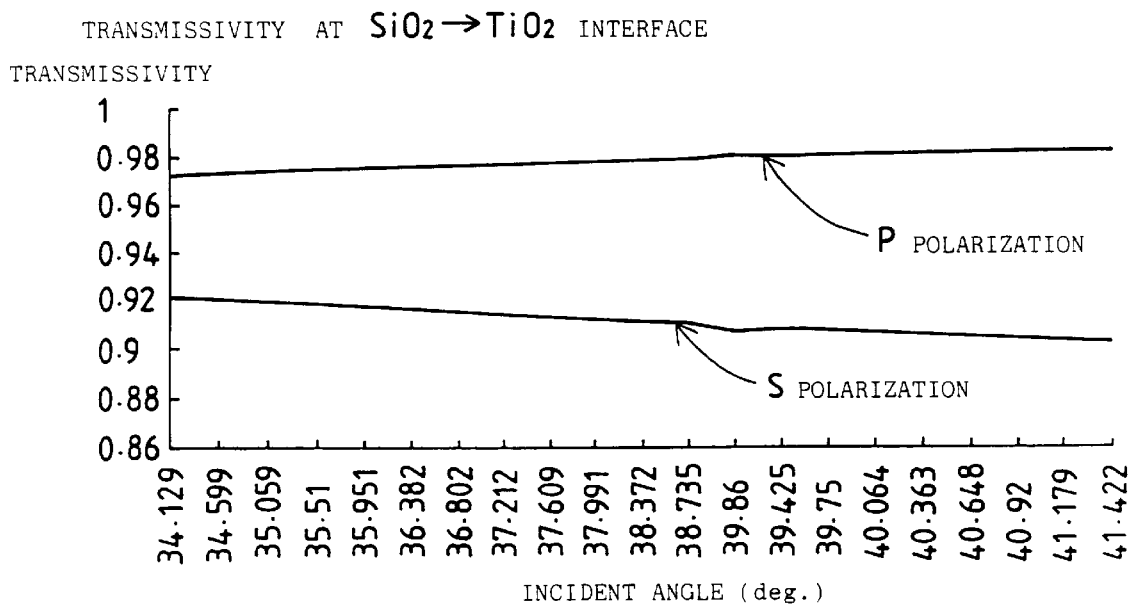
FIG. 14 is a graph expressing the transmissivity of each polarization component on the interface of the second layer and third layer in the structure shown in FIG. 11 by the function of an incident angle.

FIG. 12 to FIG. 14 are graphs for explaining this, in which the light transmissivity of each interface in the layer composition of the embodiment is divided into the P polarization component and S polarization component. As immediately known from these graphs, if the incident angle of the representative layer D0 into the layer 181 is deviated by about 10° from 70°, the transmissivity of the P polarization component on each interface remains close to 100%. The transmissivity of the S polarization component is always less than the transmissivity of the P polarization component.

It tells that the P polarization component purifying function of the multilayer type polarization separating plate is established not only in a specific condition.

It is hence known that the constitution making use of the multilayer type polarization separating plate of the embodiment is suited to the case requiring exit light of high degree of polarization (purity of P polarization component).

Figure 15:
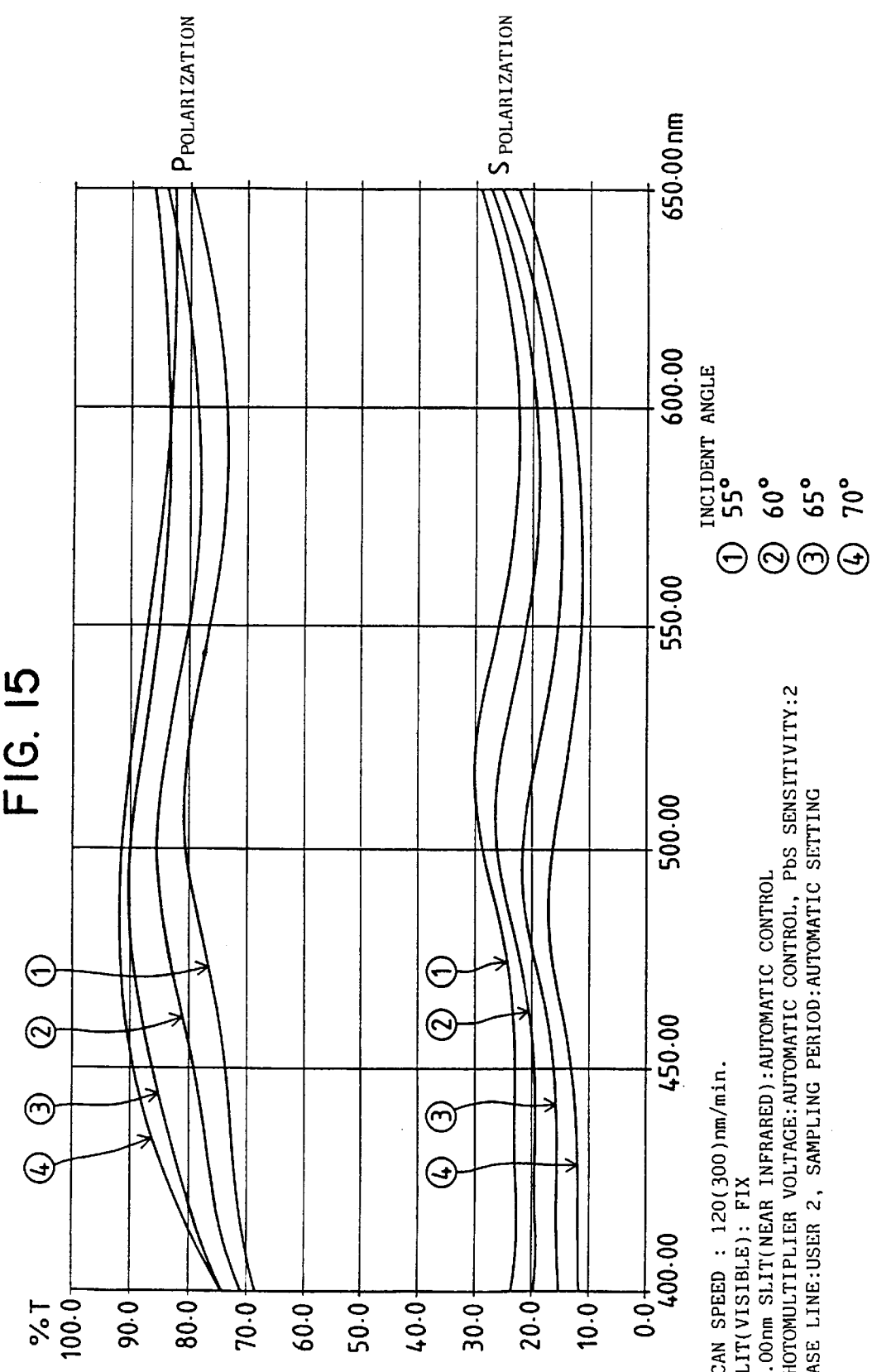
FIG. 15 is a graph showing the results of measuring the polarization separating function while varying the incident angle from 55° to 70°, by using a spectrophotometer, of the polarization separating plate forming a multilayer film of TiOx, SiO2 and ZrO2 on a 1 mm thick optical glass plate BK-7 by vacuum deposition.

For reference, an example of measured data is shown in FIG. 15. In the measurement, on a 1 mm thick optical glass plate BK-7 (refractive index 1.5163), a multilayer film composed of TiOx (refractive index about 2.3), SiO2 (refractive index 1.46), and ZrO2 (refractive index 2.0) was formed as a polarization separating plate by vacuum deposition, and it was used. Using a spectrophotometer U-3200 of Hitachi, the polarization separating function was measured while varying the incident angle from 55° to 70°.

As easily known from this graph, a high polarization separating function is exhibited over a whole range of visible light. The greater the incident angle, it is also found, the higher the polarization separating function tends to be.

In this embodiment, too, same as explained in the first and second embodiments, the polarization scramble effect on the return light and the intensifying action of the P polarization component by re-exit from the light flux parallelizer 1 are exhibited. Furthermore, by disposing the exit light direction modifier 10 behind the multilayer type polarization separating plate 18, the exit light direction can be also modified.

The first to fourth embodiments relate to variations of the constitution of the polarization separating means. In the fifth and subsequent embodiments to be described below, it is characterized by using additional constitution (polarization converting means) for intensifying the action for converting the return light returning from the polarization separating means into the light flux parallelizer from S polarization component into P polarization component.

That is, the essential portions of the fifth and subsequent embodiments may be combined with any of the first to fourth embodiments. Therefore, the "polarization separating plate 8 (mentioned in the first embodiment)" in the description relating to the embodiments may be replaced by the type disclosed in other second to fourth embodiments. The following embodiments are described on the basis of such condition.

Figure 16:
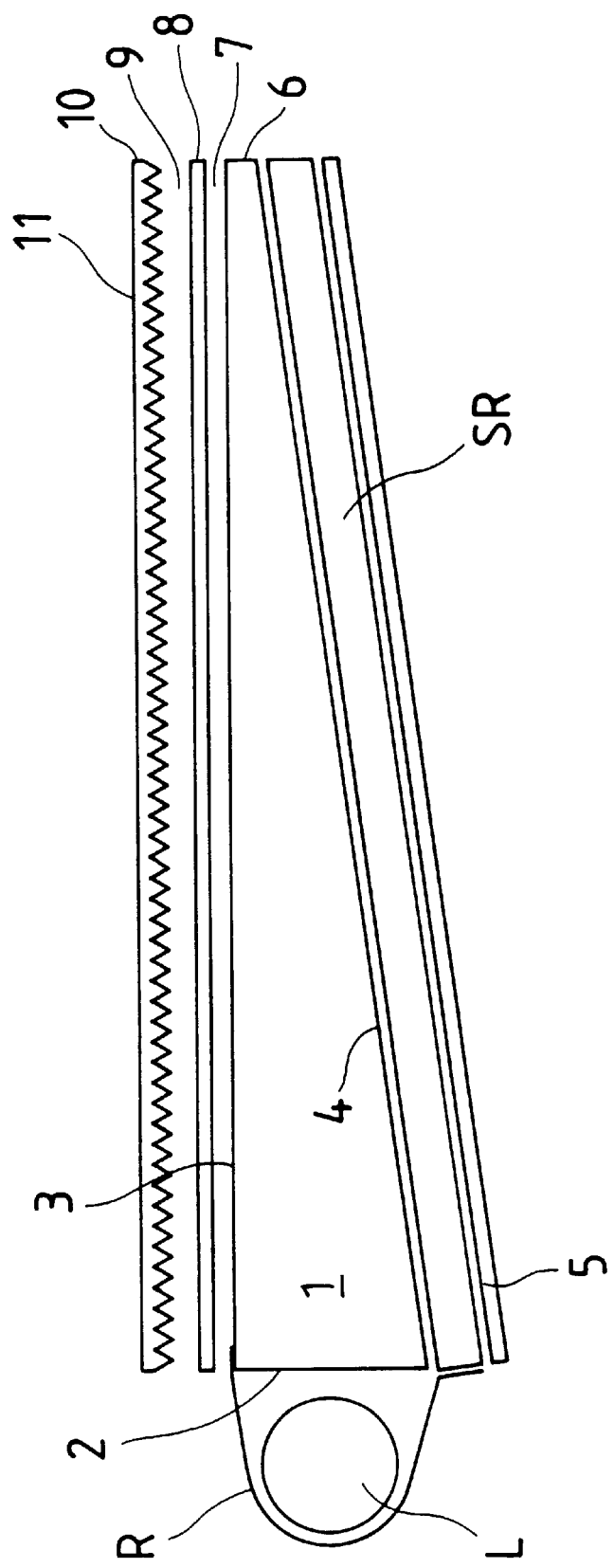
FIG. 16 is a sectional view of a fifth embodiment of the invention.

The fifth embodiment is described in the first place, in which a light scattering light guide of flat plate having a high scattering function is used as the intensifying means of polarization scramble action (hereinafter called polarization scrambler) for converting the return light from S polarization component into P polarization component FIG. 16 is a sectional view of the fifth embodiment of the invention. The light flux parallelizer 1 having a wedge section is constituted by uniformly dispersing particles of silicone resin material (particle size 2 μm, refractive index= 1.4345) at a rate of 0.07 wt. % in polymethyl methacrylate (PMMA). The light flux parallelizer 1 measures 68 mm in length in the lateral direction in the drawing, and 85 mm in width. The thickness is 4.0 mm at the end of the light incident surface 2 side, and 0.2 mm at the end portion 6.

Reference code L denotes a fluorescent lamp of 3 mm in diameter, disposed at a distance of 1 mm from the light incident surface 2 of the light flux parallelizer 1, and the light enters to the right from this fluorescent lamp L, and a parallelized light flux is taken out from the light exit surface 3. Reference code R represents a reflector (silver foil) located so as to surround the fluorescent lamp L.

At the position confronting the light exit surface 3 of the light flux parallelizer 1 across an air layer 7, a polarization separating plate 8 is disposed as polarization separating means, and further at the outer side is disposed an exit light direction modifier 10 across an air layer 9. Reference numeral 11 is a light exit surface of the exit light direction modifier 10, and is also is a light exit surface as the surface light source device. When using the surface light source device as the backlight source of a liquid crystal display, a liquid crystal display panel is disposed at a further outside of the exit light direction modifier 10.

The polarization separating plate 8 is a 1 mm thick flat plate made of optical glass BK-7. The constitution described so far is same as in the first embodiment, and the action is basically the same, and hence detailed description is omitted herein.

What this embodiment differs from the first embodiment lies in that a polarization scrambler SR is provided in order to intensify the polarization scramble action on the return light returning from the polarization separating plate 8 into the light flux parallelizer 1, along the back surface 4 of the light flux parallelizer 1. This polarization scrambler SR is an element for preventing shortage of polarization scramble action when the thickness of the entire light flux parallelizer 1 or near the wedge shaped end portion 6 is insufficient in relation to the intensity of scattering capability.

Therefore, the polarization scrambler SR is made of a light scattering light guide having a stronger scattering capability than the light flux parallelizer 1. Herein, in polymethyl methacrylate (PMMA), particles of silicone resin material (particle size 2 μm, refractive index=1.4345) were uniformly dispersed at a rate of 0.5 wt. %. The size of the polarization scrambler SR corresponds to the back surface 4 of the light flux parallelizer 1, and the thickness is 1 mm.

A considerable quantity of light invades from the light flux parallelizer 1 into the polarization scrambler SR, and the S polarization component is converted into P polarization component by the anisotropic scattering action due to refractive index non-uniform structure (herein, materials differing in refractive index). This light undergoes a sufficient polarization scramble action corresponding to its strong scattering capability, and returns into the light flux parallelizer 1. As a result, the polarization scramble action which is likely to be deficient especially near the end portion 6 is intensified.

Therefore, the P polarization component when the return light is emitted again toward the polarization separating plate 8 is close to 50%, and thereby the P polarization component contained in the exit light flux is finally enriched. Reference numeral 5 denotes a reflector made of silver foil provided outside of the polarization scrambler SR, and it prevents diffusion of light from outside of the polarization scrambler SR.

Figure 17:
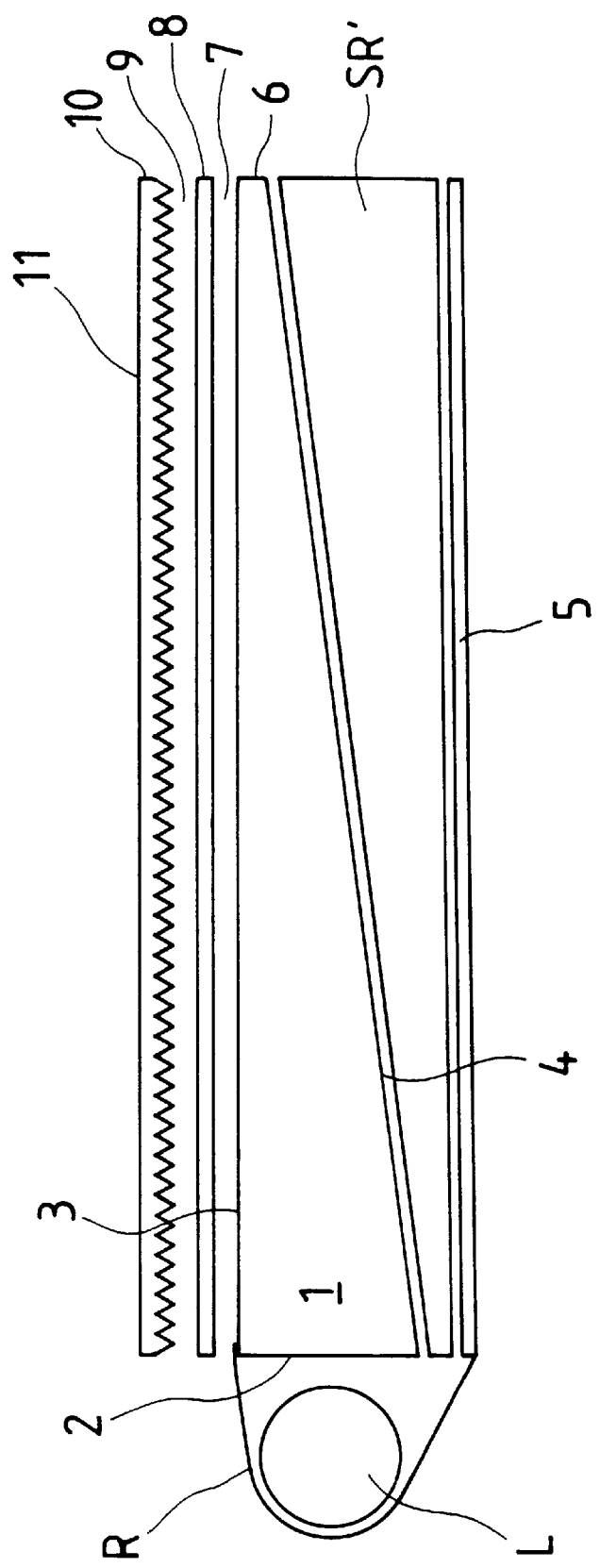
FIG. 17 is a sectional view of a sixth embodiment of the invention.

FIG. 17 shows a sixth embodiment using a wedge shaped polarization scrambler SR' instead of the flat plate polarization scrambler SR in the fifth embodiment. In this embodiment, the intensity of the polarization scramble action depending on the thickness of the light flux parallelizer 1 is canceled by the action of the wedge shaped polarization scrambler SR' disposed complementarily. As a result, the polarizing function of the surface light source device is made further uniform. The size of the wedge shaped polarization scrambler SR' is matched with the back surface 4 of the light flux parallelizer 1, and the thickness is 4 mm in the maximum area and 0.2 mm in the minimum area.

The entire constitution of the embodiment is same as in the fifth embodiment except for the shape of the polarization scrambler SR', and the description is omitted herein.

Figure 18:
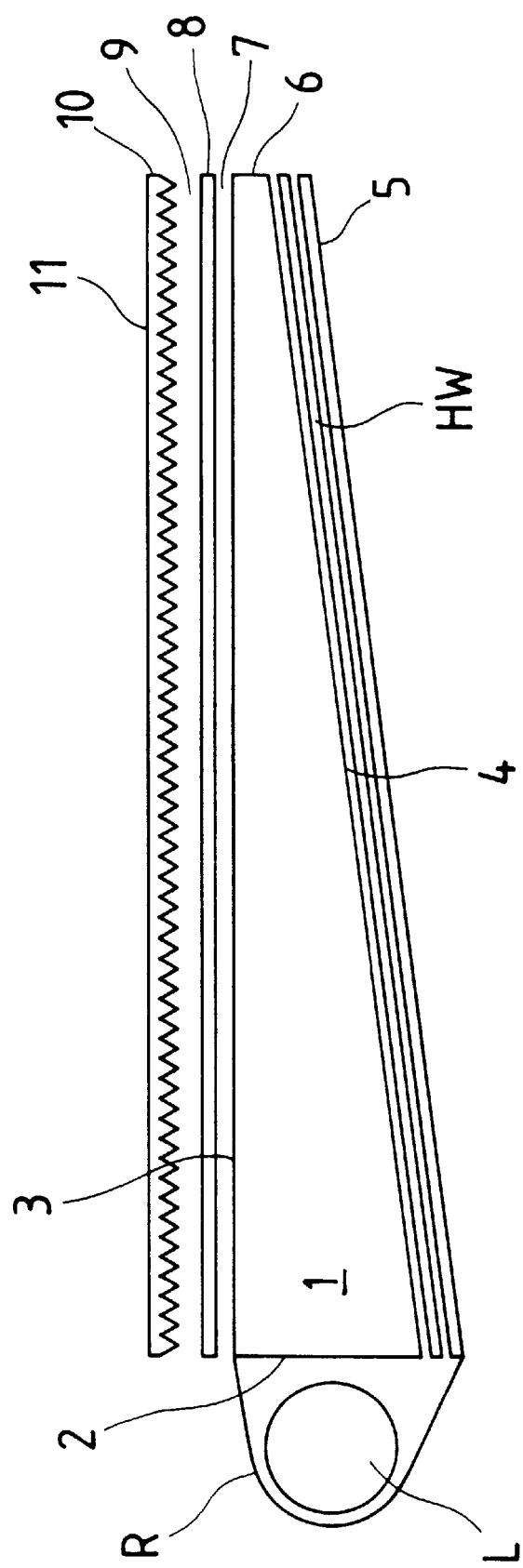
FIG. 18 is a sectional view of a seventh embodiment of the invention.

FIG. 18 is a sectional view of a seventh embodiment of the invention. The light flux parallelizer 1 is constituted by uniformly dispersing particles of silicone resin material (particle size 2 μm, refractive index=1.4345) at a rate of 0.07 wt. % in polymethyl methacrylate (PMMA). The light flux parallelizer 1 measures 68 mm in length in the lateral direction in the drawing, 85 mm in width, 4.0 mm at the end of the light incident surface 2 side, and 0.2 mm at the end portion 6.

Reference code L denotes a fluorescent lamp of 3 mm in diameter, disposed at a distance of 1 mm from the light incident surface 2 of the light flux parallelizer 1, and the light enters to the right from this fluorescent lamp L, and a parallelized light flux is taken out from the light exit surface 3. Reference code R represents a silver foil sheet located so as to surround the fluorescent lamp L.

At the position opposite to the light exit surface 3 of the light flux parallelizer 1 across an air layer 7, a polarization separating plate 8 is disposed as polarization separating means, and further at the outer side is disposed an exit light direction modifier 10 across an air layer 9. Reference numeral 11 is a light exit surface of the exit light direction modifier 10, and is also is a light exit surface as the surface light source device. When using the surface light source device as the backlight source of a liquid crystal display, a liquid crystal display panel is disposed at a further outside of the exit light direction modifier 10.

The polarization separating plate 8 is a 1 mm thick flat plate made of optical glass BK-7. The constitution described so far is same as in the first embodiment like the fifth and sixth embodiments, and the action is basically the same, and hence detailed description is omitted herein.

What this embodiment differs from the foregoing embodiments lies in that a phase difference plate HW acting as a half wavelength plate in the entire range of visible rays along the back surface 4 of the light flux parallelizer 1, and that a reflector 5 made of silver foil is disposed further at the outer side. The phase delay axis direction of this phase difference plate is set so as to incline by 45° to the vertical and lateral ridges of the light flux parallelizer 1. The thickness is adjusted so as to give a phase difference of π/2 (Δn·d; where n is the birefringence value of phase difference plate HW, and d is optical path length) when the return light (straight running return light) from the polarization separating plate 8 is transmitted from the back surface 4 by passing through the light flux parallelizer 1. Supposing the return light to be derived from the representative ray C0 in FIG. 5 (exit angle 65°), the incident angle into the phase difference plate HW is calculated to be about 60°. This ray of 60° incident angle is provided with the phase difference.

Now let us take note of the component hardly undergoing polarization scramble action, out of the return light from the polarization separating plate 8. This component is considered to correspond to the straight running return light. The phase difference plate HW functions as a half wavelength plate particularly effective on the S polarization component. That is, the straight running return light is converted into P polarization component rich light by passing through the route of back surface of light flux parallelizer 1→phase difference plate HW→reflector 5→phase difference plate HW→back surface of light flux parallelizer 1.

This light is mostly emitted again at an exit angle of about 65° from the light flux parallelizer 1 by the forward scattering property of the light flux parallelizer 1. The majority of the P polarization component of this light is not reflected by the polarization separating plate 8, but is emitted from the surface light source device as polarized light. This polarization converting action is exhibited simultaneously with the polarization scramble action of the light flux parallelizer 1, and therefore the polarized light flux rich in P polarization component energy on the whole is obtained.

As mentioned above, as a representative application making the beset of the feature of the invention, a backlight of liquid crystal display is known. The conventional surface light source device was not provided with the polarization function as in the invention, and about half of the light energy of the backlight illuminating light was shielded and lost by the polarizer disposed at the light incident side of the liquid crystal display panel. When the surface light source device of the invention is applied to backlight of a liquid crystal display, this loss is suppressed, and the rate of light energy effectively contributing to the display is increased.

Figure 19:
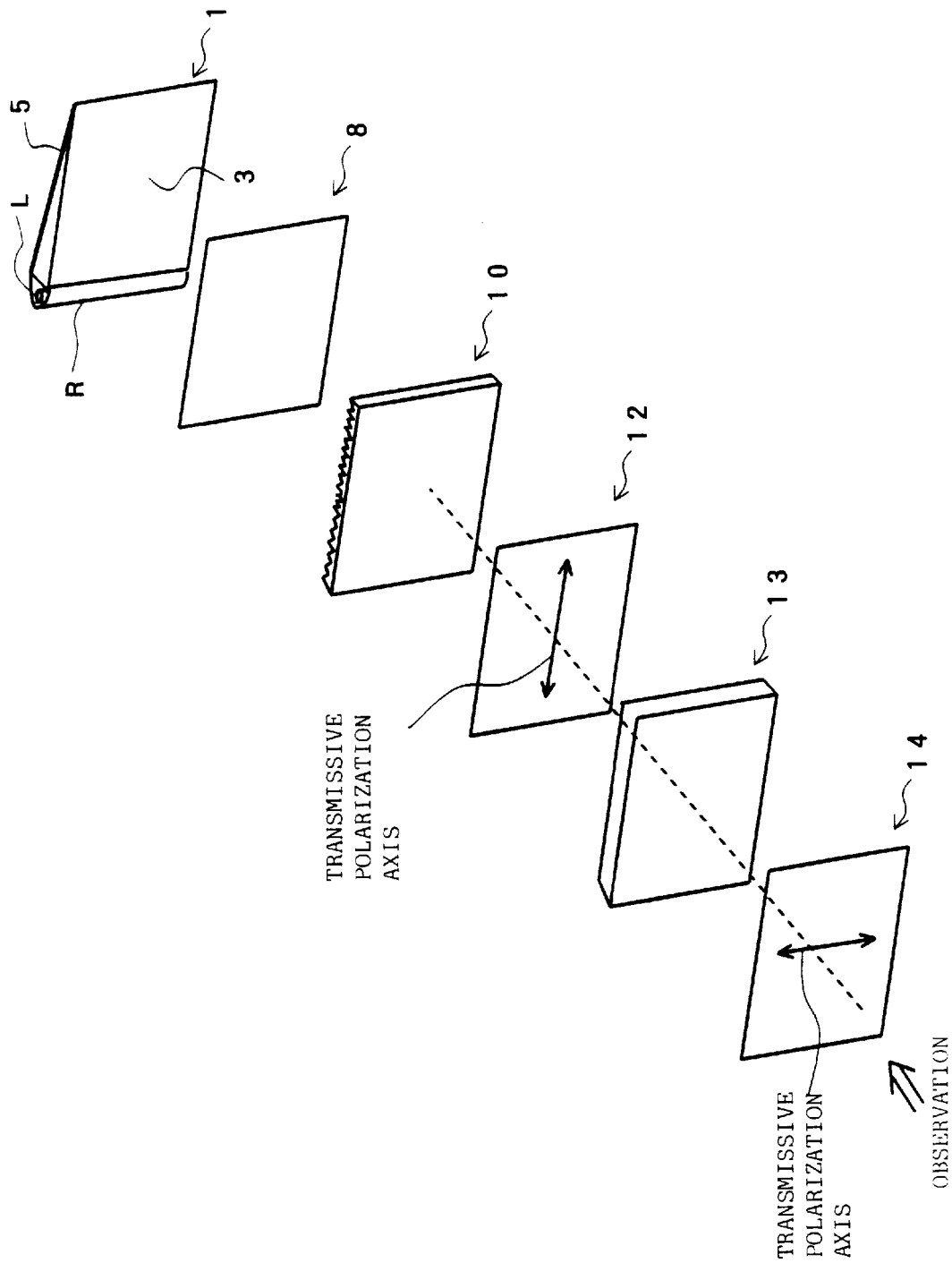
FIG. 19 is an exploded perspective view of constitution of an eighth embodiment of the invention applied to backlight of a liquid crystal display.

FIG. 19 shows an eighth embodiment of the invention. This diagram is an exploded perspective view of a fundamental configuration of the surface light source device with polarization function according to the invention used as the backlight of a liquid crystal display. In this embodiment, as the backlight, the same surface light source device as shown in the first embodiment (see FIG. 4) is used. Common elements are indicated by same reference numerals.

Reference numeral 1 is a light flux parallelizer composed of a light scattering light guide of directive emissivity having a wedge shaped section. Herein, the light scattering light guide is fabricated by dispersing uniformly particles of silicone resin material (particle size 2 $\mu$m, refractive index= 1.4345) at a rate of 0.08 wt. % in polymethyl methacrylate (PMMA). In this condition, when the effective scatter irradiation parameter E and correlation distance a are calculated, and the results are E=7.39[cm$^{-1}$] and a=1.3 $\mu$m. The size of the light flux parallelizer 1 is adjusted to the size of the liquid crystal cell to be used, being 68 mm in length in the lateral direction in the drawing, 85 mm in width, 4.0 mm at the end of the light incident surface, and 0.2 mm at the end portion.

Reference code L is a fluorescent lamp of 3 mm in diameter disposed at a distance of 1 mm from the incident surface of the light flux parallelizer 1. The light entering to the right from this fluorescent lamp L is taken out as parallelized light flux from the light exit surface 3. Reference code r is a silver foil sheet. At the back surface 4 side of the light flux parallelizer 1, a reflector (silver foil sheet or white sheet) 5 is disposed.

Reference numeral 8 is a polarization separating plate 8 disposed at a position confronting the light exit surface 3 of the light flux parallelizer 1. At the further outside is disposed an exit light direction modifier 10. The polarization separating plate 8 is a 1 mm thick flat plate member made of optical glass BK-7 (refractive index 1.5163). The exit light direction modifier 10 is made of polycarbonate (PC; refractive index 1.59). The exit light direction modifier 10 is disposed so that its prism forming surface may be directed to the direction of the polarization separating plate 8.

At the light exit side of the backlight is disposed a liquid crystal display panel comprising two polarizers 12, 14, and a liquid crystal cell 13 interposed between them. The direction of transmission polarization axis of the polarizer 12 at the light incident side is set so as to be directed in the horizontal direction in the drawing. On the other hand, the direction of transmission polarization axis of the polarizer 14 at the light exit side is set so as to be directed in the vertical direction in the drawing.

As already described specifically, the light flux emitted from the backlight (surface light source device) composed of the light source (fluorescent lamp) L, light flux parallelizer 1, reflectors R, 5, polarization separating plate 8, and exit light direction modifier 10 has a high degree of polarization.

At the same time, it also possesses the directivity along the direction indicated by broken line in the drawing, and a light intensity profile of high degree of flatness.

As clarified in the explanation about the polarization process utilizing the light flux parallelizer 1 and polarization separating plate 8, since the light flux emitted from the surface light source device with polarization function is P polarized, the principal polarization axis is directed to the horizontal direction in the drawing in the illustrated configuration condition. Therefore, the light transmissivity of the backlight illuminating light when passing through the polarizer 12 exceeds 50%.

Such feature could not be expected in the conventional constitution. In the conventional constitution, whichever direction was selected for the transmission polarization direction of the polarizer of the liquid crystal panel incident side, at least 50% of the light energy was wasted.

In this embodiment, the surface light source device in the first embodiment is used as the backlight, but if any surface light source device disclosed in other embodiments is used, a similar liquid crystal display can be constituted.

The panel size widely demanded in the liquid crystal display of video camera, personal computer, word processor, television or the like is about 3 inches to 10 inches. In this case, it is preferred that the values of the effective scatter irradiation parameter E and correlation distance a of the light flux parallelizer should satisfy the following conditions.

Effective scatter irradiation parameter E:

$$2.77[\text{cm}^{-1}] \leq E \leq 9.24[\text{cm}^{-1}]$$

Correlation distance a: $a \leq 7$ $\mu$m (considering the above condition $a \geq 0.06$ $\mu$m, $0.06$ $\mu$m $\leq a \leq 7$ $\mu$m)

Figure 20:
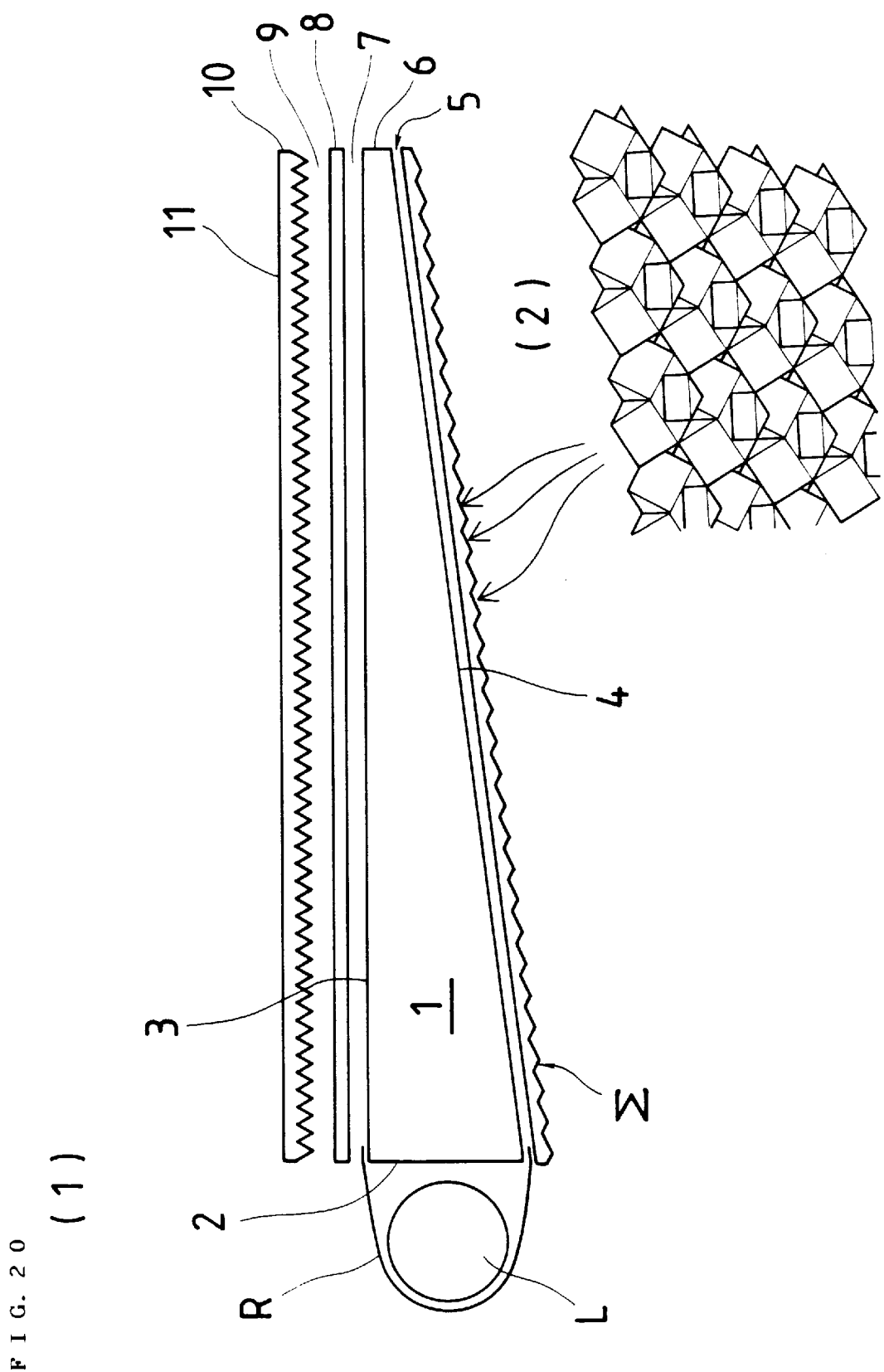
FIG. 20(1) and FIG. 20(2) relate to a ninth embodiment.

FIG. 20(1) and FIG. 20(2) relate to a ninth embodiment. In FIG. 20(1), the entire constitution is shown in a section view, and FIG. 20(2) shows appearance of the undulated surface formed on the back side slope of the polarization converter used therein. The light flux parallelizer 1 a light scattering light guide fabricated by dispersing uniformly particles of silicone resin material (particle size 2 $\mu$m, refractive index=1.4345) at a rate of 0.07 wt. % in polymethyl methacrylate (PMMA). In this condition, when the effective scatter irradiation parameter E and correlation distance a are calculated, and the results are E=7.39[cm$^{-1}$] and a=1.3 $\mu$m. The light flux parallelizer 1 measures 68 in length in the lateral direction in the drawing, 85 mm in width, 4.0 mm at the end of the light incident surface, and 0.2 mm at the end portion.

A fluorescent lamp L of 3 mm in diameter is disposed at a distance of 1.00 mm from the light incident surface 2 of the light flux parallelizer 1. The light is supplied to the right from this fluorescent lamp L, and is taken out as parallelized light flux from the light exit surface 3. The fluorescent lamp L is surrounded by a silver foil sheet R.

At the back surface 4 side of the light flux parallelizer 1, a polarization converter Σ is disposed across a thin air layer 5 or without air layer. The polarization converter Σ is intended to intensify the polarization function of the surface light source device by making use of the polarization converting action accompanying reflection (usually total reflection) in the prism. The structure and action are described in detail later.

At the position confronting the light exit surface 3 of the light flux parallelizer 1 across an air layer 7, a polarization separating plate 8 is disposed as polarization separating means, and further at the outer side is disposed an exit light direction modifier 10 across an air layer 9. Reference numeral 11 is a light exit surface of the exit light direction modifier 10, and is also is a light exit surface as the surface light source device. When using the surface light source device as the backlight source of a liquid crystal display, a liquid crystal display panel is disposed at a further outside of the exit light direction modifier 10.

The polarization separating plate 8 and exit light direction modifier 10 are the same as used in the foregoing embodiments. By the cooperative action of the polarization separating plate 8 and light flux parallelizer 1, the polarization function is achieved.

In this cooperative action, conversion of S polarization component contained in the return light into P polarization component is exclusively effected by the polarization scramble effect of the light flux parallelizer 1. Therefore, near the wedge shaped end portion 5 of the light flux parallelizer 1, the scramble effect tends to be insufficient.

The polarization converter Σ disposed along the back surface 4 of the light flux parallelizer 1 presents means for overcoming this. The polarization converter Σ converts the S polarization component of the light escaping from the back surface 4 of the light flux parallelizer 1 into P polarization component, and returns to the light flux parallelizer 1.

This polarization converter Σ has triangular columnar quadrature prisms made of optical material united sequentially so that the axial directions of triangular columns may be directed in three dimensions orthogonal to each other, and an integrated compound prism region is formed. By forming a deflection optical circuit including three total reflections inside, an exit light converted in the polarization direction of incident ray by 90° is taken out.

Figure 21:
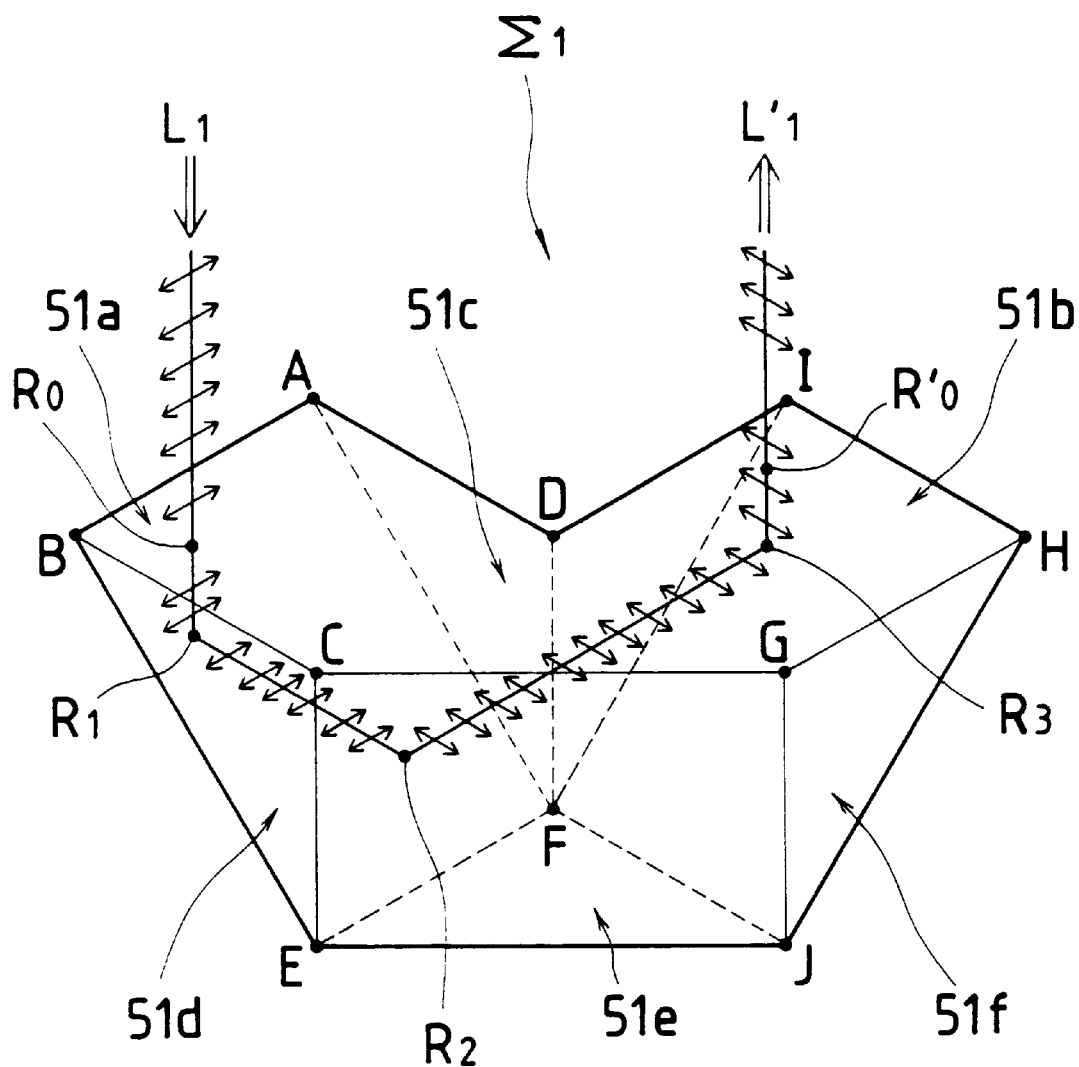
FIG. 21 is a perspective view showing the structure of a polarization conversion unit.

The compound prism region for composing the principal area of the polarization converter Σ has a polarization conversion unit as a basic unit element. FIG. 21 is a perspective view showing the structure of the polarization conversion unit. Referring now to FIG. 21, the principle of polarization conversion of the polarization converter Σ is described below.

The polarization conversion unit Σ1 totally indicated by reference code Σ1 has a volume region made of an integrated optical material having three triangular columnar right-angled isosceles triangular prisms ABCDEF, DCGEFJ, DGHIFJ united so that the axial directions of each triangular column may be directed in three directions orthogonal to each other. The optical material for composing such compound prism may be light permeable plastic material (acrylic resin, etc.), optical glass, or the like. Considering the ease of processing of material, the former material is preferred.

The refractive index of the material is practical in a range of about 1.4142 (inside incident angle for giving the total reflection condition to the air is 45°) to 2.0, and most of ordinary optical materials satisfy this condition.

The polarization conversion unit Σ1 has the following polarization conversion function. Suppose a linear polarized light L1 enters vertically to the square surface region ABCD (surface 51a). The linear polarized light L1 is supposed to have a electric field vector oscillation surface in a direction parallel to side AB as indicated by small arrow. The propagation route of ray (linear polarized light) L1 is in the sequence of incident point R0 to surface 51a→total reflection point R1 on surface 51d→total reflection point R2 on surface 5e→total reflection point R3 on surface 51f→exit point R'0 from surface 51b. The incident ray L1 and exit ray L1' are in a parallel direction (reverse in propagation direction).

The polarization direction is preserved at the total reflection point R1, but is converted 90° to a direction parallel to side HI at R2. At R3, the converted state is preserved, and is emitted as ray L1'. As a result, the polarization direction of the exit ray L1' is shifted 90° from the polarization direction of incident ray L.

Similarly, when the polarization direction of the incident ray L1 is vertical to AB, the polarization direction of the exit ray L1' is vertical to side HI, that is, parallel to side AB. Accordingly, from the principle of overlapping, it is known that the polarization conversion unit Σ1 has an action for converting the polarization direction of the incident ray by 90° (shifting by rotation) regardless of the condition of polarization direction. Therefore, assuming a light rich in S polarization component as the ray L1, the exit ray L'1 is a light rich in P polarization. Incidentally, the deviation of the incident angle on the surface 51a from the vertical direction lowers the conversion efficiency. As far as the deviation is not large, however, a considerable polarization conversion efficiency is expected.

The incident region in which such polarization conversion action is exhibited in the surface 51a enclosed by ABCD. Besides, when the light propagation direction is reverse, the surface 51b enclosed by IDGH presents an equivalent incident surface to 51a. Hereinafter, these two surfaces 51a, 51b, or corresponding surfaces are called "effective surfaces."

By contrast, when light enters vertically to a triangular surface 1c enclosed by points CDG, the light mostly transmits parallel to the axial directions of the triangular column CDGEFJ. It does not contribute to polarization conversion action. Hereinafter, this surface 51c or a corresponding surface is called a "noneffective surface". By forming a reflective film on the back surface EFJ of this noneffective surface, a reflective noneffective surface may be formed. Or, by forming a reflective film (for example, deposition of aluminum) also on the slope of the back surface side of the effective surface, the refractive index condition (1.4142 or more) to cause total reflection inside the polarization converter may be alleviated for the vertical incident light.

The rate of the effective surface on the whole incident surface ABCGHID of the polarization conversion unit Σ1 is evaluated to be 80%, and the rate of the noneffective surface is evaluated to be 20%. If a linear polarized parallel light flux having a section similar to the incident surface ABCGHID enters vertically to the polarization conversion unit Σ1, the polarization direction is converted in 80% thereof.

Multiple polarization conversion units Σ1 are arranged parallel in various forms, and a polarization converter relatively small in thickness is composed. The effective surface of each polarization conversion unit Σ1 is utilized in mass integration, and thereby the polarization conversion action is exhibited at high efficiency in the incident light flux of wide sectional area.

When multiple polarization conversion units Σ1 are disposed parallel, an area not occupied by either effective surface or noneffective surface is formed due to the restrictions in shape. This area is called a "blank area". By forming a reflective film at the front (inlet side as seen from the light incident side) or at the bottom (outlet side as seen from the light incident side) of the blank area, a reflective blank area may be formed.

The parallel layout of a multiplicity of polarization conversion unit Σ1 may be generally divided into two types. In one type, the polarization conversion units Σ1 are disposed individually. In the other type, several (for example, four or more) polarization conversion units Σ1 are combined into a block (called united block hereinafter), which is used as a unit of arrangement.

Furthermore, when arranging these polarization conversion blocks Σ1 or united blocks parallel, two forms are known. In a first form, the polarization conversion units Σ1 are arranged so that their effective surfaces may be mounted on a same plane. In a second form, the effective surfaces of the polarization conversion units Σ1 are distributed on plural mutually parallel slopes.

In the latter form, a polarization converter having multiple effective surfaces directed to a inclination direction to the extending direction of the polarization conversion elements is composed. The polarization conversion elements are effective for realizing the vertical incident condition on the effective surfaces.

In any form or arrangement, the polarization conversion action of the polarization conversion elements is based on the polarization conversion action of the polarization conversion unit Σ1.

When actually manufacturing the polarization converter, from the viewpoint of mechanical strength and manufacturing process, it is preferred that the multiple polarization conversion units Σ1 or united blocks be coupled optically and mechanically with a substrate region composed of optical material. For example, uniting without boundary by injection molding, and adhering by transparent adhesive may be applied.

The substrate region is generally in a form of flat plate or sheet on the whole. However, the (geometrical) boundary surface of the substrate region and the polarization conversion unit corresponding portion may not be always mounted on a flat plane. The relation inclined to the extended flat plane of the polarization converter defined in the entire extending direction of the substrate region may be defined on this boundary surface. In this case, the polarization conversion action is achieved to the light entering at an angle inclined to the extending flat plane of the polarization converter. The inclination angle is preferred to be selected in order to satisfy the vertical incident condition on the effective surface.

Referring also to FIGS. 22 to 26 successively, a typical example of the polarization converter Σ used in the invention is described below.

FIG. 22(1) is a sectional view showing a first example of the polarization converter Σ. FIG. 22(2) is a see-through perspective view as seen from the surface side of the substrate region, by extracting and magnifying the unit element in the polarization conversion unit formation region. The polarization conversion unit formation region is coupled to the substrate region. The entire polarization converter Σ is composed of substrate region Q1 and polarization conversion unit formation region Σ'1.

The polarization conversion unit formation region Σ'1 is composed by distributing united blocks Σ4 of polarization conversion units in the shape shown in FIG. 22(2) parallel individually at the back surface side of the substrate region Q1. The arrangement pattern of united blocks Σ4 of polarization conversion units is optional. The united blocks Σ4 are disposed closely to each other, but the united blocks Σ4 are not coupled with each other systematically. The united blocks Σ4 of polarization conversion blocks have four radially coupled polarization conversion units, and a square hole A is formed in the middle. FIG. 22(2) refers to one polarization conversion unit, identified with the reference numerals conforming to FIG. 21.

According to a typical method of coupling four polarization conversion units, blocks Σ4 are composed of the same optical material to form one united body. As for optical and mechanical coupling of the surfaces of each polarization conversion unit corresponding to surfaces 51a to 51c with the substrate region Q1, it is preferred that the same integration be applied. That is, it is preferred that the polarization converter Σ be united by using the same optical material. Such uniting of the polarization converter may be easily realized by applying the injection molding technology by using one transparent plastic material (acrylic resin, etc.).

The light incident and exit surfaces of the polarization conversion units (surfaces corresponding to 51a to 51c) are on one plane. When a linear polarized light flux enters vertically to the extending direct on of the polarization converter Σ, the light flux converted in the polarization direction by 90° is emitted in the U-turn route of substrate→polarization conversion unit→substrate. Since there is a considerable spread in the direction of the light emitted from the back surface 4 of the light flux parallelizer 1, the corresponding portion is converted in the polarization direction by 90°.

The light emitted from the back surface of the light flux parallelizer 1, especially the light emitted near the end portion 6 (see FIG. 20) contains much S polarization component attributable to the return light. Therefore, the P polarization function of the end portion weak in the scramble effect of the light flux parallelizer 1 is intensified more powerfully. As a result, the entire scramble effect of the light flux parallelizer 1 is averaged.

In this embodiment, the bottom of the hole A is given in the back surface of the substrate region Q1. By forming a reflective film in this area, the light can be returned to the surface side of the polarization converter Σ. A similar design is possible also on the back surface of the noneffective surface 51c (corresponding to the surface of the substrate region Q1). Such deformation of the hole or back surface of the polarization converter is the same in the following embodiments. In the embodiments to follow, therefore, the repeated explanation about this point is omitted.

Figure 23:
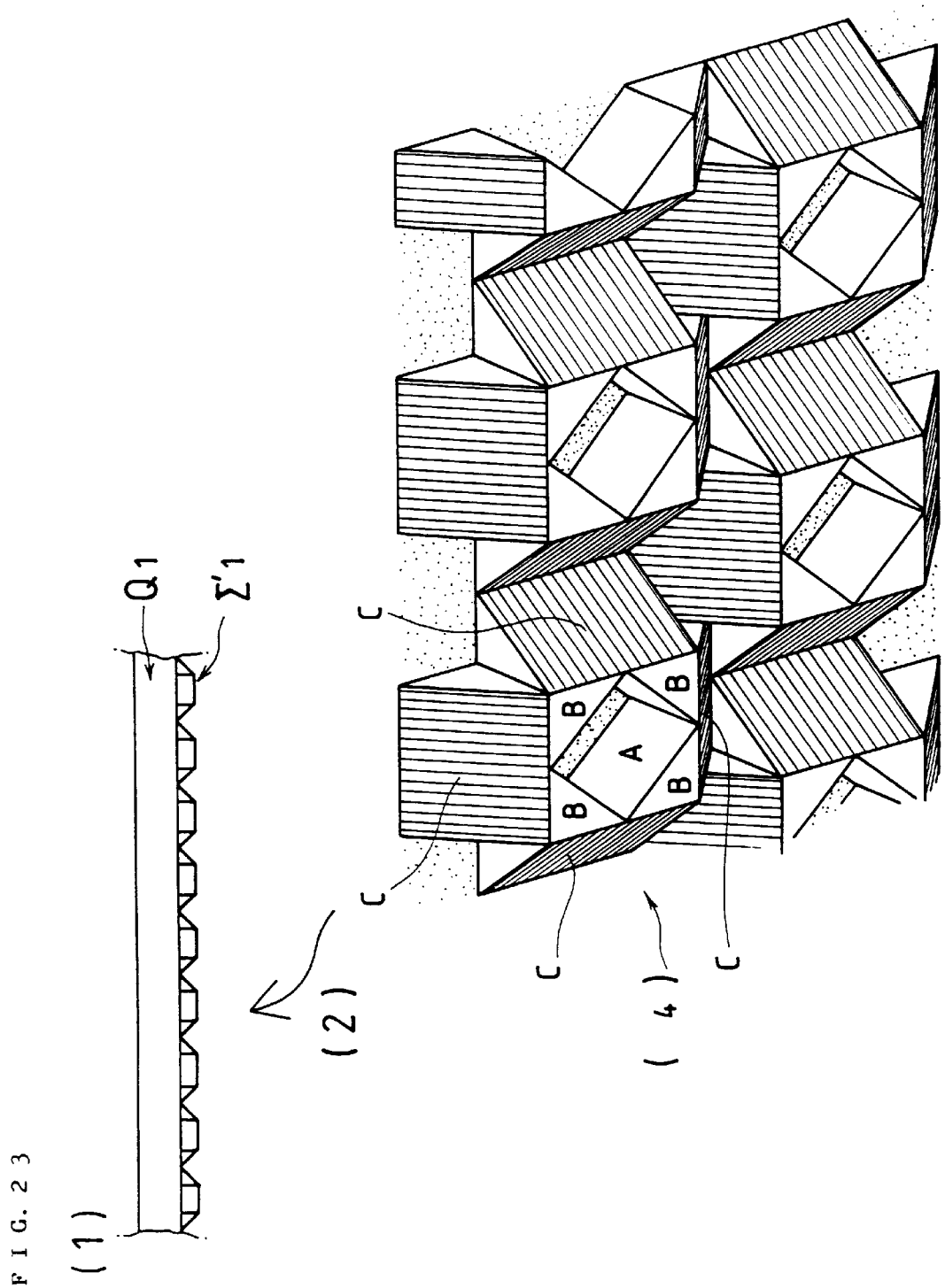
FIG. 23(1) and FIG. 23(2) show other examples of polarization converter Σ.

FIG. 23(1) and FIG. 23(2) illustrate another example of polarization converter Σ. Multiple united blocks Σ4 of polarization conversion units are coupled at maximum density, and the polarization conversion unit formation region is presented. FIG. 23(1) shows a schematic sectional structure of the entire polarization converter. FIG. 23(2) is a perspective view showing a part of the polarization conversion unit formation region Σ'1 formed on the back surface of the substrate, and the appearance as seen from the substrate back surface side (undulated pattern) is shown.

FIG. 23(2) shows a coupling form of blocks Σ4. In one block E4, hole A, flat plane B, and slope C are indicated. The flat plane B is at a position corresponding to the back surface of the noneffective surface 51c mentioned above. The slope C is at a position corresponding to the back surface of the effective surface 5a.

FIG. 24(1) symbolizes the undulated pattern of the polarization conversion unit formation region Σ'1 shown in FIG. 23(2). Symbols A, B, C indicate respectively the hole, flat plane, and slope, same as in FIG. 23(2). The slope C shows the direction of inclination by using arrow. The arrow direction shows the direction from the ridge portion projecting to the back side of the polarization converter Σ toward the substrate region Q1. The dimensions for manufacturing the polarization converter by injection molding of transparent plastic material are shown (in the unit of mm).

Figure 25:
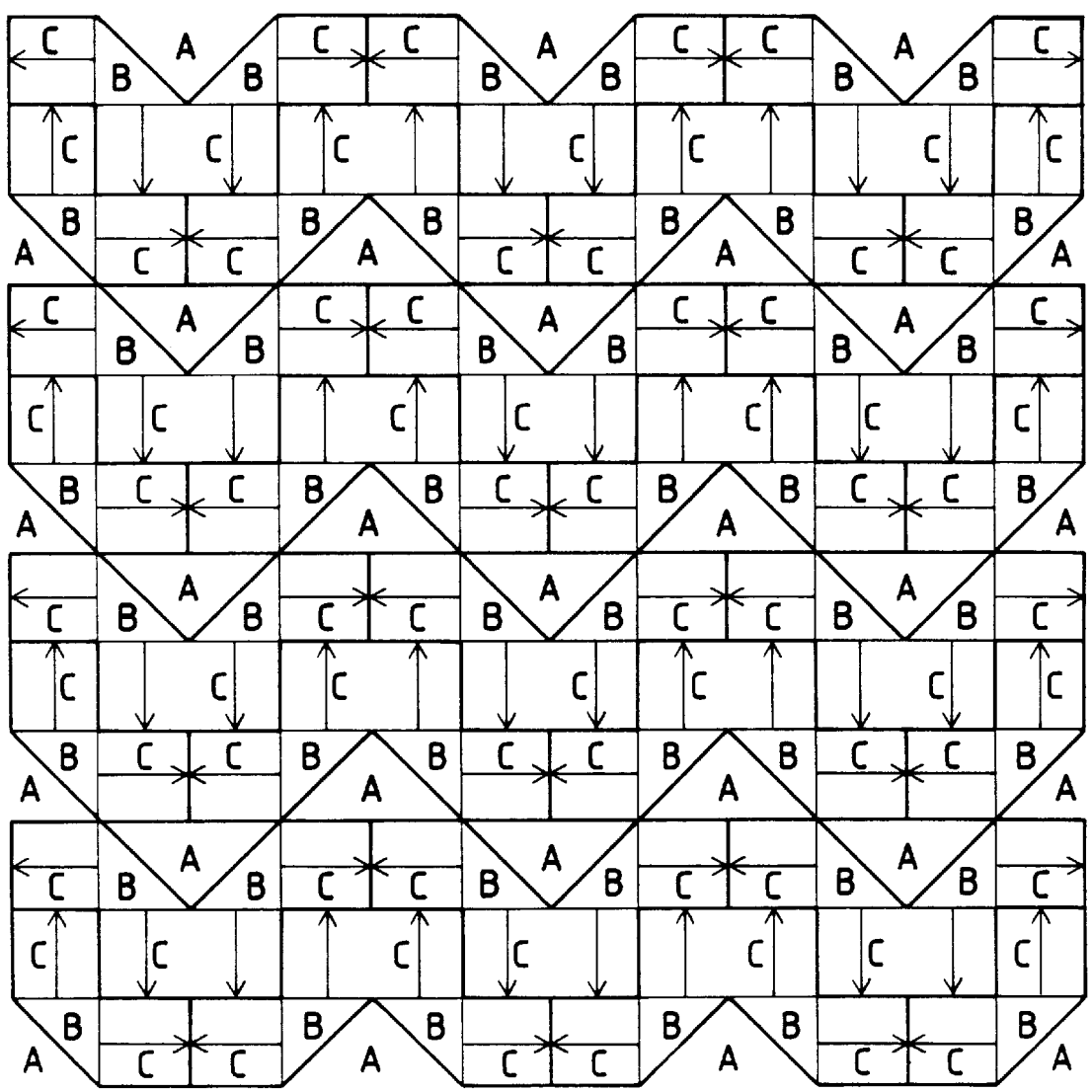
FIG. 25 shows an undulated pattern on the back side of polarization converter for modified embodiments shown in FIG. 22 and FIG. 23.

FIG. 25 shows the undulated pattern of the back surface of the polarization converter in modified examples of the embodiment shown in FIG. 22 and FIG. 23. The method of notation is the same as in FIG. 24. What this example differs from the examples shown in FIG. 22 and FIG. 23 is only the united layout pattern of the block composed of four polarization conversion units. This united pattern corresponds to the united pattern in FIG. 24(1) by shifting each block unit row by half pitch each of the block (dislocated).

It is preferred to unite the entire polarization converter in one body by using the same optical material (especially, transparent plastic material). By applying the technology of injection molding, the shape and dimensions of the undulated pattern may be freely selected through the shape of the mold.

In these undulated patterns, the light incident and exit surfaces of each polarization conversion unit (corresponding to surfaces 51a to 51c) are on the same plane. When a linear polarized light flux enters vertically to the extending direction in the polarization converter Σ, the light flux converted in the polarization direction by 90° is emitted through the U-turn route of the substrate→polarization conversion unit→substrate. Therefore, when any one of the polarization converters shown in FIG. 23 to FIG. 25 is disposed along the back surface 4 of the light flux parallelizer 1 (see FIG. 20), the polarization function of the surface light source device is intensified by the same reason as when using the polarization converter shown in FIG. 22.

FIG. 26(1) to FIG. 26(3) represent two examples allowing the light incident and exit directions to be taken in a direction inclined to the extending direction of the polarization converter. In these examples, the light incident and exit directions are inclined to the extending direction of the polarization converter. The both sides of the substrate region or the back surface (the surface of the side coupled optically and mechanically to the polarization conversion unit) is a repetitive slope.

In FIG. 26(1), the both sides of the substrate region are repetitive slopes. On the surface side of the substrate region, a slope Qa functioning as light incident and exit surfaces, and a slope Qb not functioning as light incident and exit surfaces substantially are formed alternately. The boundary surface (back surface) with the polarization conversion unit formation region is shaped the same as the surface side. On the inclined boundary the surface, the undulated shape patter shown in FIG. 26(3) is formed.

FIG. 26(3) is a diagram seeing the undulated shape pattern of the polarization conversion unit formation region from the back side of the polarization converter Σ. As the types of the undulated pattern, those shown in FIG. 23 and FIG. 24 are given. They may be replaced by the type shown in FIG. 25. Or, multiple united blocks of four units shown in FIG. 22(2) may be disposed parallel.

In any one of these cases, on the boundary surface (inclined to the extending direction of the polarization converter Σ) of the polarization conversion unit formation region and substrate region, both are coupled optically and mechanically. The same as in the case mentioned above, when molding integrally the polarization converter by injection molding technology, optical and mechanical coupling is achieved automatically.

According to the great advantage of the polarization converter shown in FIG. 26, the polarization function is enhanced by selecting the inclination angle of the repetitive slope of the substrate region depending on the directivity of the light emitted from the back surface 4 of the light flux parallelizer 1, especially the directivity of the return light.

For example, the return light is assumed to be derived from the representative ray C0 (exit angle 65°) in FIG. 5. The angle ψ (see FIG. 3) of the wedge form of the light flux parallelizer 1 using PMMA as the matrix is assumed to be about 3°. The incident angle β1 of the light entering again in the light flux parallelizer 1 and running straight into the back surface 4 is about 35°, and the exit angle β2 is about 60°.

Accordingly, in the example shown in FIG. 26(1), the slope Qa is formed with an inclination of about 30° to the extending direction of the polarization converter Σ so as to be vertical to the propagation direction of the incident light. The slope qb is preferred to be formed so as to be parallel to the incident light. In this condition, it is possible to enter the incident light vertically into each effective surface on the polarization conversion unit formation region of the polarization converter Σ.

The light rich in S polarization component entering vertically into each effective surface (surfaces corresponding to surfaces 51a, 51b in FIG. 21) undergoes polarization conversion action, and is emitted from the polarization converter Σ as the light rich in P polarization component, and enters again into the light flux parallelizer 1. As a result, the P polarization component of the light propagating in the light flux parallelizer 1 increases, and the polarization function of the entire surface light source device is intensified.

On the other hand, in FIG. 26(2), the repetitive slope of the substrate region is formed only on the back surface side. In this case, the incident light and exit light undergo refractive action depending on the refractive index difference with the air on the substrate region surface side Qc. Therefore, assuming the return light in the same condition as in FIG. 26(1), in the case of using PMMA as the material for the polarization converter Σ (β1=about 35°), the inclination angle of the slope Qd is preferred to be about 35° to the extending direction of the polarization converter β. The slope Qe is preferred to be formed so as to be parallel to the incident light.

In this condition, more incident light vertical to the effective surface is obtained, and same as in the case of FIG. 26(1), the polarization function of the entire surface light source device is intensified.

As the undulated pattern of the polarization conversion unit formation region, there is no particular limitation, as in the case of FIG. 26(1). The types shown in FIG. 22 and FIG. 23, or the type shown in FIG. 25 may be employed. The same as in the examples given above, it is preferred that the entire polarization converter Σ be composed integrally by injection molding technology.

Various examples of the polarization converter Σ are described so far. However, the polarization converter Σ used in the invention is not limited to these examples alone. Any other arbitrary types may be employed as far as it is composed of multiple polarization conversion units of the type shown in FIG. 21 arranged in parallel layout.

As the method of coupling the substrate region with the polarization conversion unit formation region optically and mechanically, aside from the injection molding method, various methods may be employed, such as adhesion by using a transparent adhesive, and fixing with frame member by tightly disposing the two.

Figure 27:
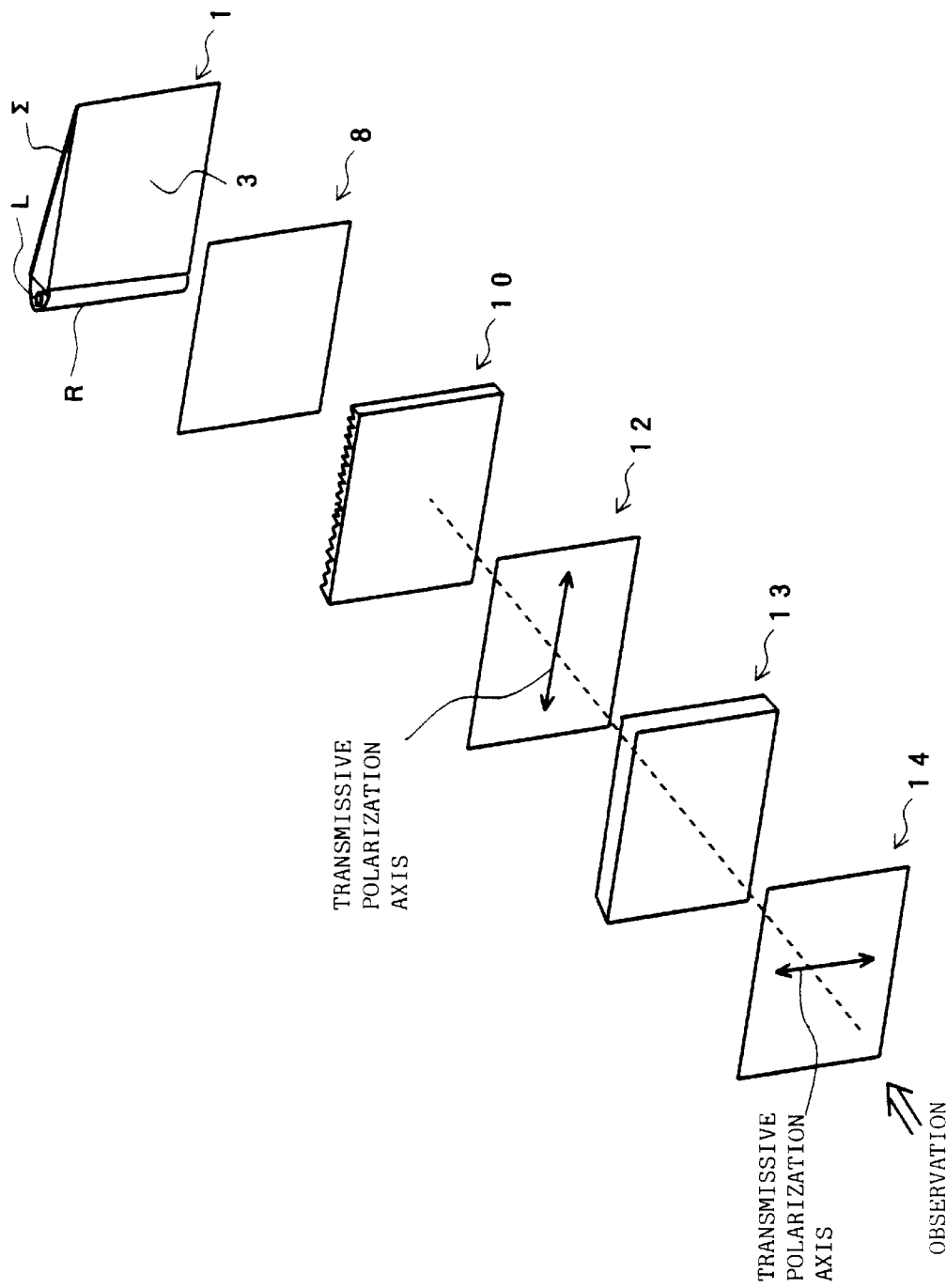
FIG. 27 is an exploded perspective view of constitution of a tenth embodiment of the invention applied to backlight of liquid crystal display.

FIG. 27 is an exploded perspective view of a basic configuration of application of the invention to backlight of a liquid crystal display device. In this tenth embodiment, the surface light source device shown in FIG. 20 is used as the backlight.

The basic structure of this embodiment is same as that of the eighth embodiment shown in FIG. 19. The difference from the eighth embodiment lies in that the polarization converter Σ is disposed on the back surface 4 of the light flux parallelizer 1. This polarization converter Σ may be any one of the polarization converters explained above. For example, the converter shown in FIG. 26(1), FIG. 26(2) may be used.

As already described specifically, the backlight illuminating light emitted from the backlight (surface light source device) composed of light source (fluorescent lamp) L, light flux parallelizer 1, reflector R, polarization separating plate 8, exit light direction modifier 10, and polarization converter Σ possesses a high degree of polarization. It also possesses the directivity along the direction indicated by broken line in the diagram, and a light intensity profile of high degree of flatness.

Since the backlight illuminating light is P polarized, in the shown layout condition, the principal polarization axis is directed to the horizontal direction in the drawing. Therefore, the light transmissivity when the backlight illuminating light passes through the polarizer 12 exceeds 50%. Such feature could not be expected in the conventional constitution.

As mentioned in the explanation of the eighth embodiment, assuming the panel size of the liquid crystal display to be about 3 inches to 10 inches, it is preferred that the values of the effective scatter irradiation parameter E and correlation distance a of the light flux parallelizer should satisfy the following conditions.

Effective scatter irradiation parameter E:

$$2.77[\text{cm}^{-1}] \leq E \leq 9.24[\text{cm}^{-1}]$$

Correlative distance a: $a \leq 7$ μm (considering the above condition $a \geq 0.06$ μm, $0.06$ μm $\leq a \leq 7$ μm).

In the above explanation, a fluorescent lamp of long tube type was used as the light source L. In the invention, however, a light source capable of supplying light toward the light incident surface of the light flux parallelizer may be generally used. The use of a light source which does not have light emitting capability itself may be also allowed. For example, the exit end of the optical fiber bundle coupled to other light emitting device may be disposed at the side of the light flux parallelizer. The polarization characteristic of the light source L is not particularly limited. For example, if a light having a specific polarization characteristic such as light derived from laser oscillation is supplied, the intrinsic polarization action itself of the invention is not lost.

As described in detail so far, by the complicated action of the light flux parallelizer, polarization separating means having reflection characteristic depending on the polarization components, and polarization converter making use of compound prism, a recyclic polarization process is realized. Therefore, according to the invention, polarized light flux can be obtained at a high energy utilization efficiency.

Furthermore, by additionally utilizing the exit light direction modifier making use of the prism action, polarized light flux propagating in a desired direction can be generated.

Such characteristics are extremely advantageous for the application to backlight of a liquid crystal display. When the invention is applied to backlight of a liquid crystal display, it is expected to improve the display quality and power saving property of the liquid crystal display.

Finally, the materials and manufacturing method of the light scattering light guide used in the invention as the light flux parallelizer or polarization scrambler are explained.

As the base of the light scattering light guide used in the invention, various polymer materials may be used. Typical polymers are shown in Table 1 and Table 2.

TABLE 1

| Category | Name of Polymer | Refractive Index |
|---|---|---|
| MA | 1. PMMA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-n-butyl acrylate] | 1.4535 |
| XA | 18. PBzMA [polybenzyl acrylate] | 1.5584 |
| | 19. Poly(2-ClEA) [poly-2-chloroethyl acrylate] | 1.52 |

TABLE 2

| Category | Name of Polymer | Refractive Index |
|---|---|---|
| AC | 20. PVAc [polyvinyl acetate] | 1.47 |
| XA | 21. PVB [polyvinyl benzoate] | 1.578 |
| | 22. PVAc [polyvinyl phenyl acetate] | 1.567 |
| | 23. PVClAc [polyvinyl chloroacetate] | 1.512 |
| N | 24. PAN [polyacrylonitrile] | 1.52 |
| | 25. Poly(αMAN) [poly-α-methyl acrylonitrile] | 1.52 |
| α-A | 26. PMA(2Cl) [polymethyl-α-chloroacrylate] | 1.5172 |
| St | 27. Poly(o-ClSt) [poly-o-chlorostyrene] | 1.6098 |
| | 28. Poly(p-FSt) [poly-p-fluorostyrene] | 1.566 |
| | 29. Poly(o, p-FSt) [poly-o-, p-diflurostyrene] | 1.475 |
| | 30. Poly(p-iPSt) [poly-p-isopropyl styrene] | 1.554 |
| | 31. PSt [polystyrene] | 1.59 |
| C | 32. PC [polycarbonate] | 1.59 |

The light scattering light guide made of such polymer materials can be manufactured in one of the following methods.

According to one method, a forming process including a step of kneading two or more types polymers is utilized. Two or more types of polymer materials differing mutually in refractive index (the shape is not specified; industrially, for example, available in pellets) are mixed and heated and kneaded (kneading step). The kneaded liquid material is injected at high pressure into a mold of an injection molding machine, and cooled and solidified. A light scattering light guide in a shape corresponding to the shape of the mold is obtained.

Two or more types of polymers differing in refractive index being kneaded are solidified without being mixed perfectly. Their local concentration is fixed with non-uniformity (fluctuation) and a uniform scatter capability is provided.

The kneaded material is injected into a cylinder of an extrusion forming machine, and extruded in an ordinary manner, so that a formed product is obtained. By adjusting the combination of polymer blend and blending rate, light scattering light guides differing in scatter irradiation parameter E and correlation distance a can be manufactured. Examples of polymer materials that can be manufactured are shown in Tables 1 and 2.

According to other manufacturing method of materials for composing the light scattering light guide, particles of a material differing in refractive index (refractive index difference of over 0.001) are uniformly dispersed in a polymer material.

One of the methods applicable in uniform dispersion of granular material is called suspension polymerization method. According to this method, a granular material is mixed into a monomer, and polymerization reaction is executed in a state being suspended in a molten bath. By polymerization reaction, the granular material is uniformly mixed, and a polymer material is obtained. By forming, using it as starting material, a light scattering light guide of a desired shape is manufactured.

It is also preferable to prepare plural types of materials by executing suspension polymerization in combinations of various granular materials and monomers (combinations of particle concentration, particle size, refractive index, etc.). By selectively blending and forming the prepared materials, light scattering light guides of varied characteristics can be manufactured. By blending a polymer not containing granular material and a polymer containing granular material, the particle concentration can be easily adjusted.

According to other method applicable to uniform mixing of granular material, a polymer material and a granular material are kneaded. In this case, too, it is preferred to knead and form (pelletize) in combinations of various granular materials and polymers (combinations of particle concentration, particle size, refractive index, etc.). By selectively blending and forming the prepared materials, light scattering light guides of varied characteristics can be manufactured.

Moreover, the polymer blending method and granular material mixing method may be combined. For example, a granular material may be mixed in when blending and kneading polymers differing in refractive index.

Several examples of manufacturing method are listed below.

<Manufacturing method 1>

To pellets of methacrylic resin (DELVET 80N, Asahi Chemical Industry Co., Ltd.), 0.3 wt. % of 0.8 $\mu$m silicone resin powder (TOSPEARL 108, Toshiba Silicone Co., Ltd.) was added, and after mixing and dispersing by a mixer, the mixture was extruded in strands by an extruder, and pelletized by a pelletizer, and pellets uniformly dispersing silicone resin powder were prepared.

The pellets were formed in the condition of cylinder temperature of 230° C. to 260° C. and mold temperature of 50° C. by using an injection molding machine, and a wedge shaped light scattering light guide measuring 68 mm in length and 85 mm in width, with the thickness varied gradually from 3.8 mm to 0.2 mm in the longitudinal direction was obtained.

The correlation distance of the manufactured light scattering light guide was a=0.53 $\mu$m, and the estimated calculated value of the effective scatter irradiation parameter according to formula (11) was E=12.6[cm$^{-1}$].

<Manufacturing example 2>

To MMA, 0.3 wt. % of 0.8 $\mu$m silicone resin powder (TOSPEARL 108, Toshiba Silicone Co., Ltd.) was added, and spherical particles uniformly dispersing the powder were obtained by a known suspension polymerization method. By pelletizing in the same method as in manufacturing example 1 by means of a pelletizer, pellets uniformly dispersing silicone resin powder were prepared.

In the same condition as in manufacturing example 1, a similar wedge shaped light scattering light guide was obtained. This light scattering light guide could not be apparently distinguished from the light scattering light guide manufactured in manufacturing example 1. The correlation distance was a=0.53 $\mu$m, and the estimated value of effective scatter irradiation parameter by formula (11) was E=12.6 [cm$^{-1}$].

<Manufacturing method 3>

To polymethyl methacrylate (PMMA), 0.5 wt. % of polystyrene (PSt) was added, and mixed for 10 minutes by using V-tumbler and for further 5 minutes by using Henschel mixer. The mixture was fused and mixed by using a 30 mm twin-shaft extruder (Nakatani Machine Co., Ltd.) in the conditions of cylinder temperature of 220° C. to 250° C., screw rotating speed of 75 rpm, and discharge rate of 6 kg/hr, and pellets were prepared.

The pellets were formed by an injection molding machine in the conditions of cylinder temperature of 220° C. to 250° C., die temperature of 65° C., medium injection speed, and injection pressure short shot pressure plus 10 kg/cm kg/cm$^2$, and a wedge shaped light scattering light guide measuring 68 mm in length and 85 mm in width, with the length varying gradually from 3.8 mm to 0.2 mm in the longitudinal direction was obtained.

<Manufacturing method 4>

To MMA (methyl methacrylate), 0.05 wt. %, 0.08 wt. %, 0.10 wt. %, and 0.15 wt. % of 0.2 $\mu$m silicone resin powder (TOSPEARL 120, Toshiba Silicone Co., Ltd.) were added and dispersed uniformly, and thus four types of samples and other MMA sample without particle were prepared, and to these five samples in total, 0.5 wt. % of benzoyl peroxide (BPO) was added as radical polymerization initiator, and 0.2 wt. % of n-lauryl mercaptan (n-LM) was chain mover, and injection polymerization was performed for 24 hours at 70° C., and wedge shaped light scatter light guides each measuring 68 mm in length and 85 mm in width, with the thickness varying gradually from 3.8 mm to 0.2 mm in the longitudinal direction were fabricated.

<Manufacturing example 5>

To MMA (methyl methacrylate), 0.025 wt. % of silicone oil was added and dispersed uniformly, and 0.5 wt. % of benzoyl peroxide (BPO) was added as radical polymerization initiator, and 0.2 wt. % of n-butyl mercaptan (n-BM) as chain mover, and sol formation was performed for 30 minutes at 70° C., and further casting polymerization was conducted for 24 hours at 65° C., and a wedge shaped light scattering light guide measuring 68 mm in length and 85 mm in width, with the length varying gradually from 3.8 mm to 0.2 mm in the longitudinal direction was obtained.

<Manufacturing example 6>

To PMMA (polymethyl methacrylate), 0.08 wt. % of 2 $\mu$m silicone resin powder (TOSPEARL 120, Toshiba Silicone Co., Ltd.) was added, and mixed for 10 minutes by using a V-tumbler and further 5 minutes by using a Henschel mixer. The mixture was fused and mixed by a twin shaft extruder (cylinder temperature 220° C. to 250° C.) and extruded, and pellets were prepared.

The pellets were extruded and formed by using an injection molding machine at the cylinder temperature of 220° C.

to 250° C., and a wedge shaped light scattering light guide measuring 68 mm in length and 85 mm in width, with the length varying gradually from 3.8 mm to 0.2 mm in the longitudinal direction was obtained.

What is claimed is:

1. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer; and light permeable polarization separating means having reflection characteristics depending on polarization and being disposed to extend along the light exit surface of the light flux parallelizer, wherein the polarization separating means comprises a polarization separating plate made of a transparent optical material having a refractive index in a range of 1.3 to 2.0, the polarization separating means receiving light emitted from the light exit surface of the light flux parallelizer, transmitting light having a first polarization and reflecting light having a second polarization, orthogonal to the first polarization to return light having the second polarization to said light scattering light guide so that light having the second polarization has a chance of being converted into light having the first polarization by the uniform scattering power, to be transmitted through said polarization separating plate after impinging again thereupon.

2. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer;

light permeable polarization separating means having reflection characteristics depending on polarization and being disposed to extend along the light exit surface of the light flux parallelizer; and an exit light direction modifier disposed outside of the polarization separating means, wherein the polarization separating means comprises a polarization separating plate made of a transparent optical material having a refractive index in a range of 1.3 to 2.0, the polarization separating means receiving light from the light exit surface of the light flux parallelizer, transmitting light having a first polarization and reflecting light having a second polarization, orthogonal to said first polarization to return light having the second polarization to said light scattering light guide so that light having the second polarization has a chance of being converted by the uniform scattering power into light having the first polarization to be transmitted through said polarization separating plate after impinging again thereupon.

3. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer; and light permeable polarization separating means having reflection characteristics depending on polarization and being disposed to extend along the light exit surface of the light flux parallelizer, wherein the polarization separating means comprises a plurality of polarization separating plates disposed in laminates across an air layer or air layers, each being made of a transparent optical material having a refractive index in a range of 1.3 to 2.0, the polarization separating means receiving light from the light exit surface of the light flux parallelizer, transmitting light having a first polarization and reflecting light having a second polarization, orthogonal to said first polarization to return light having the second polarization to said light scattering light guide so that light having the second polarization has a chance of being converted by the uniform scattering power into light having the first polarization to be transmitted through said polarization separating plate after impinging again thereupon.

4. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer;

light permeable polarization separating means having reflection characteristics depending on polarization and being disposed to extend along the light exit surface of the light flux parallelizer; and an exit light direction modifier disposed outside of the polarization separating means, wherein the polarization separating means comprises a plurality of polarization separating plates disposed in laminates across an air layer or air layers, each being made of a transparent material and having a refractive index in a range of 1.3 to 2.0, the polarization separating means receiving light from the light exit surface of the light flux parallelizer, transmitting light having a first polarization and reflecting light having a second polarization, orthogonal to said first polarization to return light having the second polarization to said light scattering light guide so that light having the second polarization has a chance of being converted by the uniform scattering power into light having the first polarization to be transmitted through said polarization separating plate after impinging again thereupon.

5. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer; and light permeable polarization separating means having reflection characteristics depending on polarization and being disposed to extend along the light exit surface of the light flux parallelizer, wherein the polarization separating means comprises a polarization separating plate having a multilayer film made of an optical material having a refractive index in a range of 1.3 to 2.0, the polarization separating means receiving light from the light exit surface of the light flux parallelizer, transmitting light having a first polarization and reflecting light having a second polarization, orthogonal to said first polarization to return light having the second polarization to said light scattering light guide so that light having the second polarization has a chance of being converted by the uniform scattering power into light having the first polarization to be transmitted through said polarization separating plate after impinging again thereupon.

6. A surface light source device with a polarization function comprising:

a light flux parallelizer composed of a plate shaped light scattering light guide having a scattering power uniform throughout the volume of the light scattering light guide and a wedge shaped cross section, the light flux parallelizer having a thicker end side and a light exit surface;

light feed means disposed at the thicker end side of the light flux parallelizer;

light permeable polarization separating means having reflection characteristics depending on polarization and being disposed to extend along the light exit surface of the light flux parallelizer; and an exit light direction modifier disposed outside of the polarization separating means, wherein the polarization separating means comprises a polarization separating plate having a multilayer film made of an optical material having a refractive index in a range of 1.3 to 2.0, the polarization separating means receiving light from the light exit surface of the light flux parallelizer, transmitting light having a first polarization and reflecting light having a second polarization, orthogonal to said first polarization to return light having the second polarization to said light scattering light guide so that light having the second polarization has a chance of being converted by the uniform scattering power into light having the first polarization to be transmitted through said polarization separating plate after impinging again thereupon.

7. A surface light source device comprising:

a wedge shaped light guide having a scattering power uniform throughout the volume of the light guide, the light guide having a thicker end side and a light exit surface;

a light source positioned along the thicker end side of the light guide; and a polarization separating plate made of a transparent optical material having a refractive index in a range of 1.3 to 2.0, the polarization separating plate extending along the light exit surface of the light guide to receive light emitted from the light exit surface of the light guide, transmit light having a first polarization and reflect light having a second polarization, orthogonal to the first polarization so that light having the second polarization is returned to said light guide and has a chance of being converted into light having the first polarization by the scattering power, to be transmitted through said polarization separating plate after impinging again thereupon.

* * * * *

UNITED STATES PATENT AND TRADEMARK OFFICE
CERTIFICATE OF CORRECTION

PATENT NO. : 6,172,809 B1
DATED : January 9, 2001
INVENTOR(S) : Yasuhiro Koike, et al.

It is certified that error appears in the above-identified patent and that said Letters Patent is hereby corrected as shown below:

Title page,
Item [56], Foreign Patent Documents, change "7253511" to -- 7253511A --.

Column 3,
Line 41, insert -- . -- after "region".

Column 4,
Line 39, change "nantural" to -- natural --.
Line 47, insert -- . -- after "($\Phi/2$)".

Column 5,
Line 1, "Assuming" begins a new paragraph.
Line 24, change "Y" to -- $\gamma$ --.
Line 26, change "poer" to -- power --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*